US009486762B2

(12) United States Patent
Lah et al.

(10) Patent No.: US 9,486,762 B2
(45) Date of Patent: *Nov. 8, 2016

(54) CENTER FEED SYSTEM EMPLOYING REMOVABLE INSERTS IN A RETRACTABLE INJECTION NOZZLE

(71) Applicant: DELTAVALVE, LLC, Sandy, UT (US)

(72) Inventors: Ruben F. Lah, South Jordan, UT (US); Gary Larsen, West Jordan, UT (US); Kenneth Krause, Sandy, UT (US)

(73) Assignee: Deltavalve, LLC, Sandy, UT (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/874,251

(22) Filed: Apr. 30, 2013

(65) Prior Publication Data
US 2014/0097268 A1 Apr. 10, 2014

Related U.S. Application Data

(63) Continuation-in-part of application No. 12/703,644, filed on Feb. 10, 2010, now Pat. No. 8,545,680, which is a continuation-in-part of application No. 12/369,691, filed on Feb. 11, 2009, now Pat. No. 8,702,911.

(60) Provisional application No. 61/640,555, filed on Apr. 30, 2012.

(51) Int. Cl.
C10B 25/22 (2006.01)
B01J 4/00 (2006.01)
C10B 55/00 (2006.01)
C10B 1/04 (2006.01)

(52) U.S. Cl.
CPC ............. B01J 4/002 (2013.01); B01J 4/007 (2013.01); C10B 1/04 (2013.01); C10B 55/00 (2013.01)

(58) Field of Classification Search
CPC ....................................................... C10B 1/04
USPC ................................. 196/107; 202/239, 262
See application file for complete search history.

(56) References Cited

U.S. PATENT DOCUMENTS

| 7,117,959 | B2* | 10/2006 | Lah | C10B 41/02 134/95.3 |
| 7,736,470 | B2* | 6/2010 | Chen | C10B 1/04 201/25 |
| 8,545,680 | B2* | 10/2013 | Lah | B01J 4/002 196/127 |
| 8,702,911 | B2* | 4/2014 | Lah | B01D 17/00 196/107 |
| 2003/0089589 | A1* | 5/2003 | Malsbury | B01J 8/003 202/262 |
| 2003/0127314 | A1* | 7/2003 | Bell | C10B 1/04 202/262 |
| 2004/0118746 | A1* | 6/2004 | Wilborn | C10B 1/04 208/131 |
| 2004/0251121 | A1* | 12/2004 | Bosi | B01B 1/00 202/242 |
| 2005/0269247 | A1* | 12/2005 | Sparks | C10B 25/10 208/131 |

* cited by examiner

Primary Examiner — Nina Bhat
(74) Attorney, Agent, or Firm — Michael F. Krieger; Kirton McConkie

(57) ABSTRACT

A center feed system allows residual byproduct to be injected into a vessel from within the center of the vessel. The center feed system can include an inlet sleeve that is attached to the vessel and a retractable injection nozzle that extends into the vessel to inject residual byproduct into the vessel and that retracts into the inlet sleeve after injecting the residual byproduct. A retractable injection nozzle may include one or more openings that each includes an insert that can be removed from the opening. The inserts can therefore be replaced to customize the functionality of the nozzle or to replace the inserts when they have become worn.

20 Claims, 30 Drawing Sheets

CENTER FEED SYSTEM EMPLOYING REMOVABLE INSERTS IN A RETRACTABLE INJECTION NOZZLE

CROSS-REFERENCE TO RELATED APPLICATIONS

This application is a continuation-in-part of U.S. patent application Ser. No. 12/703,644 filed Feb. 10, 2010, which is a continuation-in-part of U.S. patent application Ser. No. 12/369,691 filed Feb. 11, 2009. Each of these applications is incorporated by reference.

This application also claims the benefit of U.S. Provisional Patent Application No. 61/640,555 filed Apr. 30, 2012.

BACKGROUND

In the hydrocarbon processing industry, many refineries recover valuable products from the heavy residual oil that remains after refining operations are completed. This recovery process is known as delayed coking Delayed coking produces valuable distillates, leaving coke as a byproduct in large vessels or coke drums. The process of delayed coking involves directing a flow of residual byproduct through an inlet from a feed source into the vessel referred to as a coke drum.

The general trend in the delayed coking industry is towards increased safety, durability, efficiency, and reliability. Utilizing a dispensing system that allows control over the dispensing, dispersion and flow patterns of residual byproducts, steam and quench fluid into a reservoir vessel may be desirable. As such, there is a need to improve how material and fluid including residual byproducts are injected into the large coke drums.

FIG. 1 illustrates one type of dispensing system. FIG. 1 illustrates a cutaway perspective view of a dispensing system attached or coupled to vessel 2, shown as a coke drum. Vessel 2 comprises a cylindrical sidewall support body 4 and a lower flange 5. Lower flange 5 further comprises a plurality of bolt holes 7 that are used to receive bolts therein to securely couple vessel 2 to another matching flanged member, such as a de-header valve or an intermediate spool assembly.

Coupled to the vessel 2 is a inlet 6, shown in the form of a cylindrical pipe having a flange segment and an opening 8 to allow inlet 6 to be in fluid connection with the interior of vessel 2. As a feedline is attached to inlet 6, the residual byproduct in the feedline may be received through opening 8 in inlet 6 and routed into vessel 2. Inlet 6 does not provide any degree of control over how the byproduct is feed into vessel 2. As a result, a significant amount of uneven heat distribution, thermal variance, and uneven flow channeling may exist within vessel 2 for which inlet 6 provides no ability to control.

FIG. 2 illustrates another type of dispensing system. Specifically, FIG. 2 illustrates a perspective view of a dispensing system attached or coupled to vessel 2, shown as a coke drum. Vessel 2 comprises a cylindrical sidewall support body 4 and a lower flange 5. Lower flange 5 further utilizes a plurality of bolt holes 7 that are used to receive high strength bolts to securely couple vessel 2 to another matching flanged member 9, such as a flanged member of a de-header valve or an intermediate spool assembly. Coupled to vessel 2 is a first byproduct dispenser, shown as inlet feed 1, and a second byproduct dispenser, shown as inlet feed 3 positioned opposite and coaxial with one another. Each of inlet feeds 1 and 3 function to dispense byproduct into vessel 2 during delayed coking.

Although the addition of another dispenser or inlet feed helps to alleviate some of the problems associated with the influx of residual byproduct into a coking vessel when a single inlet is used, the remedial effect or benefit of two opposing inlet feeds on these problems is only minimal. A significant amount of uneven heat distribution, thermal variance, and uneven flow channeling still exists within the vessel 2 because of the inability of the inlet feeds 1 and 3 to dispense byproduct in a controlled and predictable manner.

The uneven heat distribution, thermal variance, and uneven flow channeling is the result of various factors. For example, the combination of pressure within the feedline and the high temperature of the residual byproduct produce significant force within the feedline as byproduct enters an inlet. The residual byproduct may be propelled through the inlet, under pressure, into the interior of a vessel at high velocities, hitting the inner side of the vessel opposite the exit area of the inlet. While the vessel may be pre-heated, for example to a temperature of about 450° Fahrenheit, the incoming byproduct may be injected into the drum at a significantly higher temperature, for example about 900° Fahrenheit. The high velocity stream of heated residual byproduct collides with the inside surface of the sidewall support body that is perpendicular or substantially perpendicular to the direction of the flow of the fast moving, heated residual byproduct.

While the simplicity of the system depicted in FIGS. 1 and 2 may be desirable, systems that allow for additional control over the flow of heated residual byproduct into the vessel may be desirable. For example, the sudden influx of heated, pressurized material into a stagnant vessel may cause stark heat distribution variances throughout vessel 2, the sidewall support body 4, the lower flange 5, bolts connecting the vessel to other components, and other components.

For example, the heated residual byproduct may be injected into vessel 2 and impact the opposite sidewall. The impacted wall and surrounding area instantly begin to heat. This impact point on the sidewall is the thermal center from which heat is initially distributed to the other adjacent areas of vessel 2. Over time, the residual material gathers and builds up inside vessel 2 at this impact point. As this happens, the continuing influx of residual byproduct impacts the cooled, newly formed coke rather than the sidewall, altering the thermal center. As additional residual byproduct continues to be injected into vessel 2, the point of impact, and thus the thermal center, continues to move away from the opposing sidewall toward inlet 6, resulting in uneven heat distribution or thermal variance.

Uneven heat distribution, or thermal variance, existing within vessel 2 as a result of the influx of the residual byproduct in the manner described above induces uneven stress distribution within vessel 2 and the other connected components. This uneven stress can cause the vessel and the other components to wear out more quickly.

Further, because the delayed coking process typically utilizes at least two vessels in an alternating manner, this heating and cooling occurs in cycles. While one vessel is being filled the other is being purged of material and prepared to receive another batch of byproduct. During the off-cycle when a vessel is being purged of its contents, it is cooled by water and returned to a state of equilibrium. This cyclical pattern of dispensing hot residual byproduct into vessel 2 and subsequently hydroblasting the byproduct contributes to the thermal differential and stress within vessel 2.

Cyclical loading and unloading or stressing and unstressing of vessel 2 is referred to as thermal cycling. In addition to other factors, thermal cycling typically results in the weakening or fatiguing of vessel 2 and its component parts, which leads to a reduction in the useful life of vessel 2.

In addition to thermal variance within the vessel and injection systems, control over the flow of heated residual byproduct into the vessel may be desirable for many other reasons. As another example, coke bed morphology may be influenced by various factors including flow channeling and quench characteristics. Flow channeling is a complex process that occurs when residual byproduct is injected into the bottom of a coke drum. For example, as the vessel begins to fill, the weight of residual byproduct pressing down may begin to influence flow-channeling patterns of residual byproduct being injected into the vessel as it is ejected from an inlet. Differing flow-channeling patterns affect the coking process.

The relationship between flow channel patterns and the coking process is complex. For example, flow channeling affects not only the introduction of residual byproduct into a coking vessel, but the introduction of steam in subsequent processes and the flow of quench fluid utilized to cool the coke bed. Even or uneven flow channeling may result in different quench characteristics.

Accordingly, the complicated process that produces a particular flow channeling pattern, such as uneven flow channeling or even flow channeling, may have an attendant effect on thermal variance in the coke drum as it is being filled. Also, the movement of steam that is injected into the coke bed to crack off volatile organic compounds may result in altered quench characteristics including but not limited to the amount of water required to cool the coke bed and the path that quench fluid follows through the coke bed during the quench cycle. For example, uneven flow channeling may result in uneven quench characteristics that may alter thermal variances in the coking vessel effectively decreasing the life span of a coke vessel.

As another example, uneven flow channeling may result in quench characteristics that cool portions of the drum and coke bed dramatically, while leaving areas of the coke bed that are not cooled sufficiently prior to being cut from the drum. Explosions of hot gas, liquid and particulate matter may occur as a cutting tool is lowered through the coke bed as the heated areas of the coke bed are encountered. These explosions can be dangerous.

BRIEF SUMMARY

The present invention extends to a center feed system that allows residual byproduct to be injected into a vessel from within the center of the vessel. The center feed system can include an inlet sleeve that is attached to the vessel and a retractable injection nozzle that extends into the vessel to inject residual byproduct into the vessel and that retracts into the inlet sleeve after injecting the residual byproduct.

A retractable injection nozzle in accordance with one or more embodiments of the invention may include one or more openings that each includes an insert that can be removed from the opening. The inserts can therefore be replaced to customize the functionality of the nozzle or to replace the inserts when they have become worn.

In some embodiments, the inserts can be threaded to allow the inserts to be screwed into the openings. Also, in some embodiments, the inserts can be bolted to the retractable injection nozzle to retain the inserts within the openings.

In accordance with some embodiments, a retractable injection nozzle can include one or more grooves that extend lengthwise along the exterior surface of the retractable injection nozzle. The one or more grooves provide a channel through which the interior of the inlet sleeve can be pressurized.

In accordance with some embodiments, the inlet sleeve can include a scraper that is positioned against the exterior surface of the retractable injection nozzle such that, as the retractable injection nozzle is retracted into the inlet sleeve, any residual byproduct that has built up on the exterior surface is scraped from the exterior surface. In some embodiments, the scraper can comprise a ring that extends around the entire retractable injection nozzle.

In some embodiments, the retractable injection nozzle can be configured to minimize the amount of space required between the inlet sleeve and a nearby structure. In such cases, the retractable injection nozzle can be configured as a telescoping nozzle. Also, the retractable injection nozzle can be configured with threads that allow the nozzle to be inserted into or removed from the inlet sleeve while the nozzle is within the vessel.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a center feed system that allows residual byproduct to be injected into a vessel from within the center of the vessel. The center feed system can include an inlet sleeve that is attached to the vessel and a retractable injection nozzle that extends into the vessel to inject residual byproduct into the vessel and that retracts into the inlet sleeve after injecting the residual byproduct.

A retractable injection nozzle in accordance with one or more embodiments of the invention may include one or more openings that each includes an insert that can be removed from the opening. The inserts can therefore be replaced to customize the functionality of the nozzle or to replace the inserts when they have become worn.

In some embodiments, the inserts can be threaded to allow the inserts to be screwed into the openings. Also, in some embodiments, the inserts can be bolted to the retractable injection nozzle to retain the inserts within the openings.

In accordance with some embodiments, a retractable injection nozzle can include one or more grooves that extend lengthwise along the exterior surface of the retractable injection nozzle. The one or more grooves provide a channel through which the interior of the inlet sleeve can be pressurized.

In accordance with some embodiments, the inlet sleeve can include a scraper that is positioned against the exterior surface of the retractable injection nozzle such that, as the retractable injection nozzle is retracted into the inlet sleeve, any residual byproduct that has built up on the exterior surface is scraped from the exterior surface. In some embodiments, the scraper can comprise a ring that extends around the entire retractable injection nozzle.

In some embodiments, the retractable injection nozzle can be configured to minimize the amount of space required between the inlet sleeve and a nearby structure. In such cases, the retractable injection nozzle can be configured as a telescoping nozzle. Also, the retractable injection nozzle can be configured with threads that allow the nozzle to be inserted into or removed from the inlet sleeve while the nozzle is within the vessel.

Figure 3:
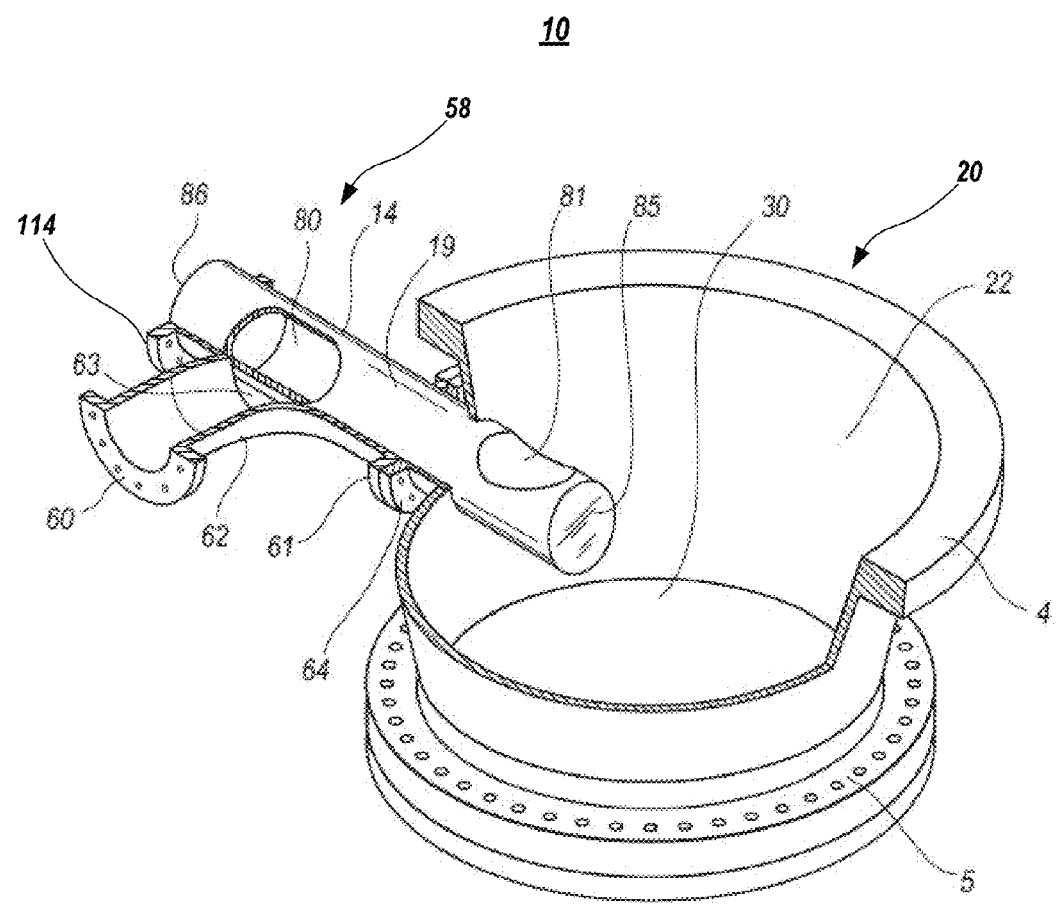
FIG. 3 illustrates a cut-away view of a center feed system in an open or extended position, according to some embodiments, as it is coupled to a spool that attaches between a coke drum and a de-header valve in a delayed coking system.

FIG. 3, illustrates an embodiment of the present invention center feed injection system 10. This depicted system comprises a spool 20, a retractable injection nozzle 14, and an inlet sleeve 58 designed to operate within a delayed coking system. In some embodiments, spool 20 comprises a cylindrical or tapered support body having a sidewall 22, an upper flange 4, and lower flange 5. In typical de-header operations, spool 20 is positioned intermediately between a coke drum and a de-header valve. A coke drum may utilize a matching flanged section that may be fitted and coupled to upper flange 4 of spool 20. Likewise, a de-header valve also having a matching flange section is fitted and coupled to lower flange 5. Spool 20 forms an interior 30 through which coke can flow when an attached de-header valve is opened. In some installations the coke drum may be welded to the spool 20, or coupled to the spool 20 utilizing a plurality of bolts fitting through the plurality of bolt holes. Likewise, the de-header valve may be welded to the spool 20, or coupled to the spool 20 using a plurality of bolts.

Center feed system 10 may comprise an inlet sleeve 58 that functions to deliver residual byproduct to a retractable injection nozzle 14. Inlet sleeve 58 may comprise a flanged component 60 allowing the inlet sleeve 58 to couple to a feed line. When attached to a feed line, a residual byproduct, such as petroleum byproducts used in the manufacture of coke, may enter the center feed system 10.

Figure 6:
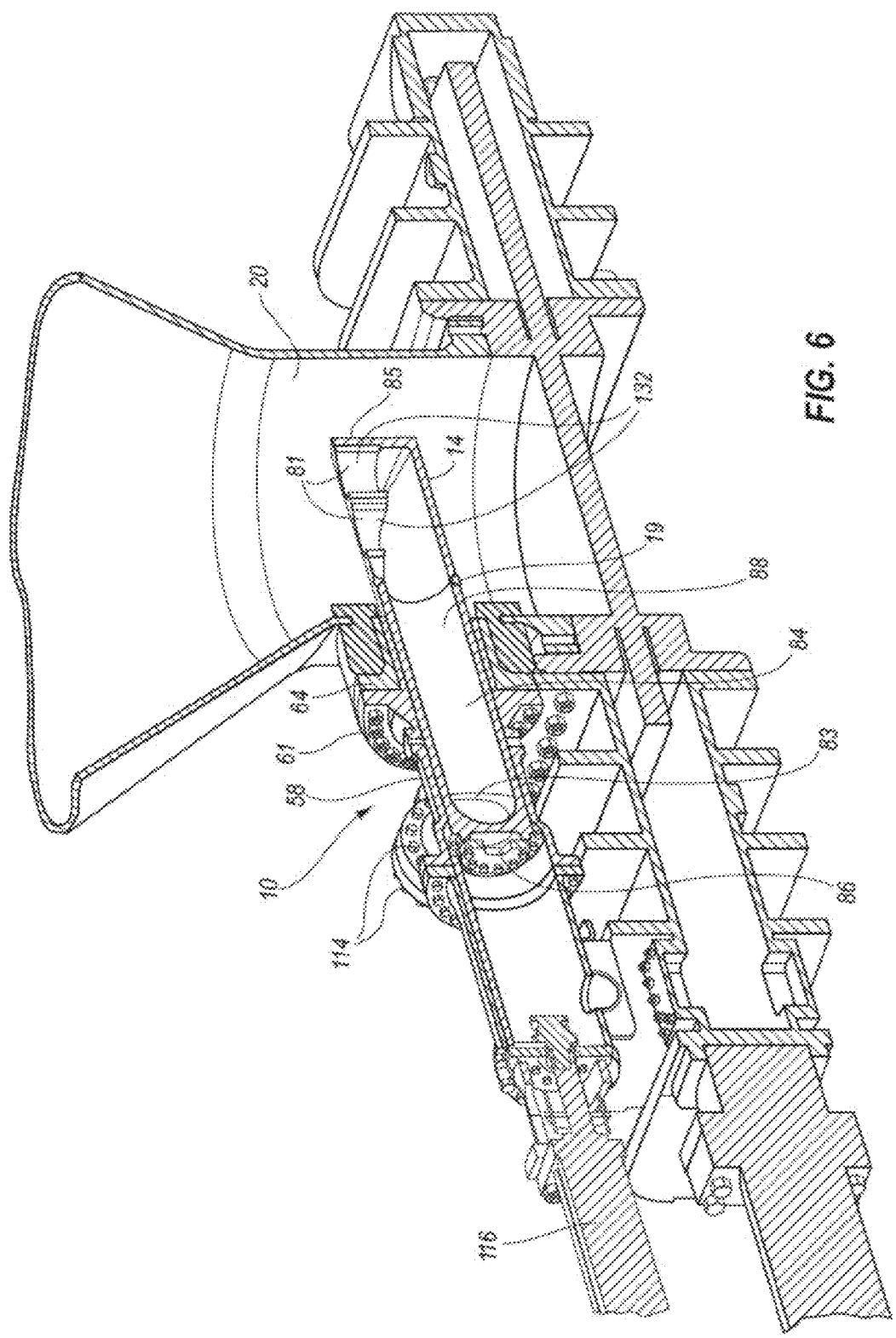
FIG. 6 illustrates a cut-away perspective view of the center feed system of FIG. 5 with the retractable injection nozzle in an extended position.
Figure 7:
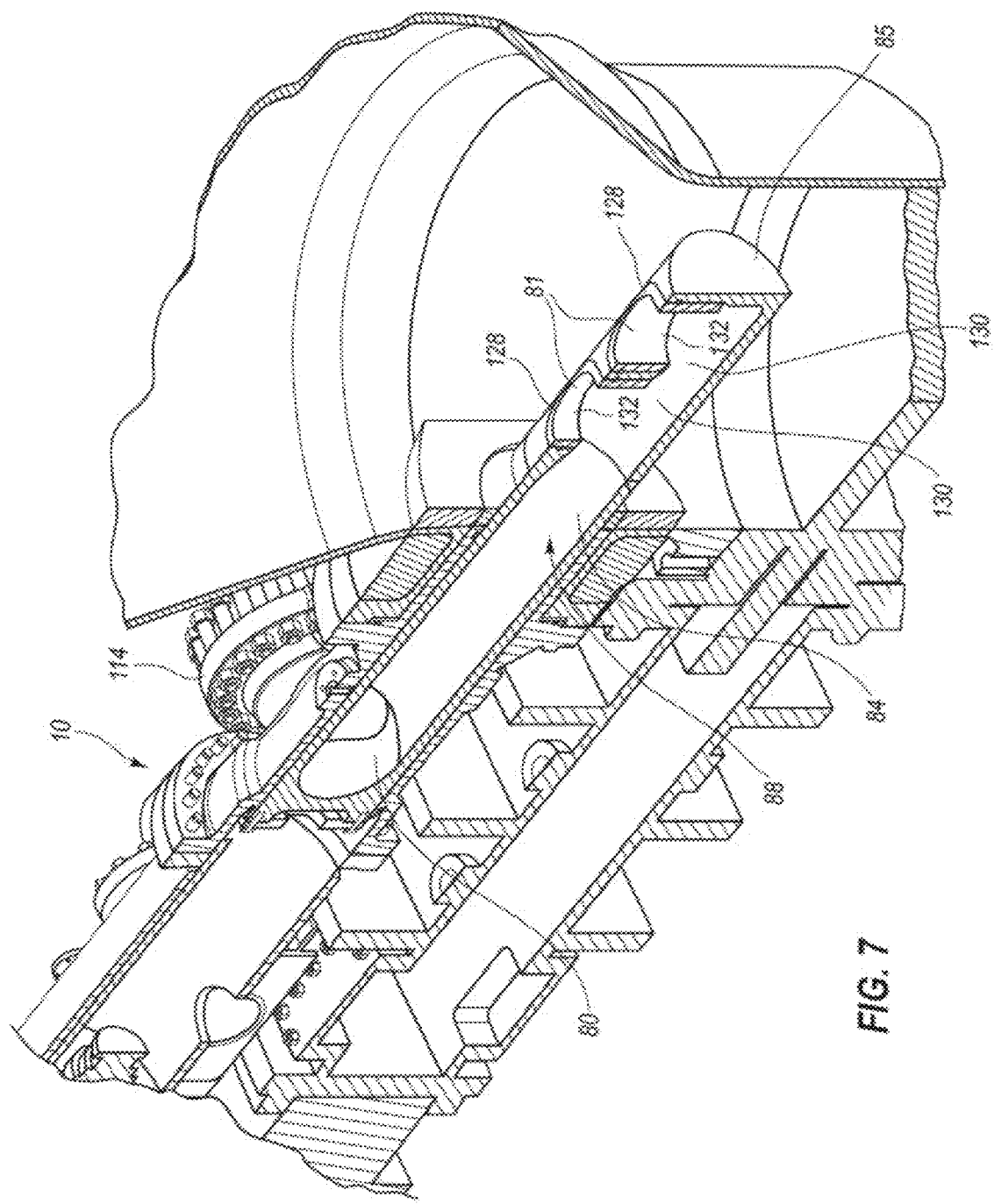
FIG. 7 illustrates another cut-away perspective view of the center feed system of FIG. 6.

In some embodiments, the retractable injection nozzle 14, when in an open position, as shown in FIGS. 3, 6, and 7, are in fluid communication with the inlet sleeve 58, allowing residual petroleum byproduct, steam and/or quench fluids to flow through the inlet sleeve 58 and into the retractable injection nozzle 14. When the retractable injection nozzle 14 is in the deployed or open position, petroleum byproduct, steam, and/or quench fluids may be allowed to flow through the retractable injection nozzle 14 out an outlet 81 into the interior of the spool 30 or, if the center feed system 10 is attached directly to a drum, to the interior of the drum.

In some embodiments, the retractable injection nozzle 14 may be modified to adjust flow characteristics. In some embodiments, the straight portion 19 of the inlet sleeve 58 may be manufactured with pipe that has the same inside diameter as a curved pipe segment 62 of the inlet sleeve 58. Alternatively, the straight portion 19 of the retractable injection nozzle 14 may be manufactured with pipe that has a larger or smaller inside diameter as a curved pipe segment 62 of the inlet sleeve 58. In some embodiments, the straight portion 19 of the retractable injection nozzle 14 is shaped precisely to fit the ellipse of a curved pipe segment 62. The shape of the injection nozzle 14 may also be shaped to be a seamless continuation of the contour of the curved pipe segment 62 when it is aligned in an open position to allow residual byproducts to flow into the vessel.

In other embodiments, the outlet 81 of the retractable injection nozzle 14 may be constructed in various shapes and sizes. In some embodiments, the outlet 81 comprises an elliptical shape and has a diameter at least as large as the cross sectional diameter of the interior cavity of the retractable injection nozzle 14 such that the outlet 81 allows for an even flow of residual byproduct into the spool 20 and vessel without increasing resistance to the flow of byproduct through the center feed system 10.

Figure 4:
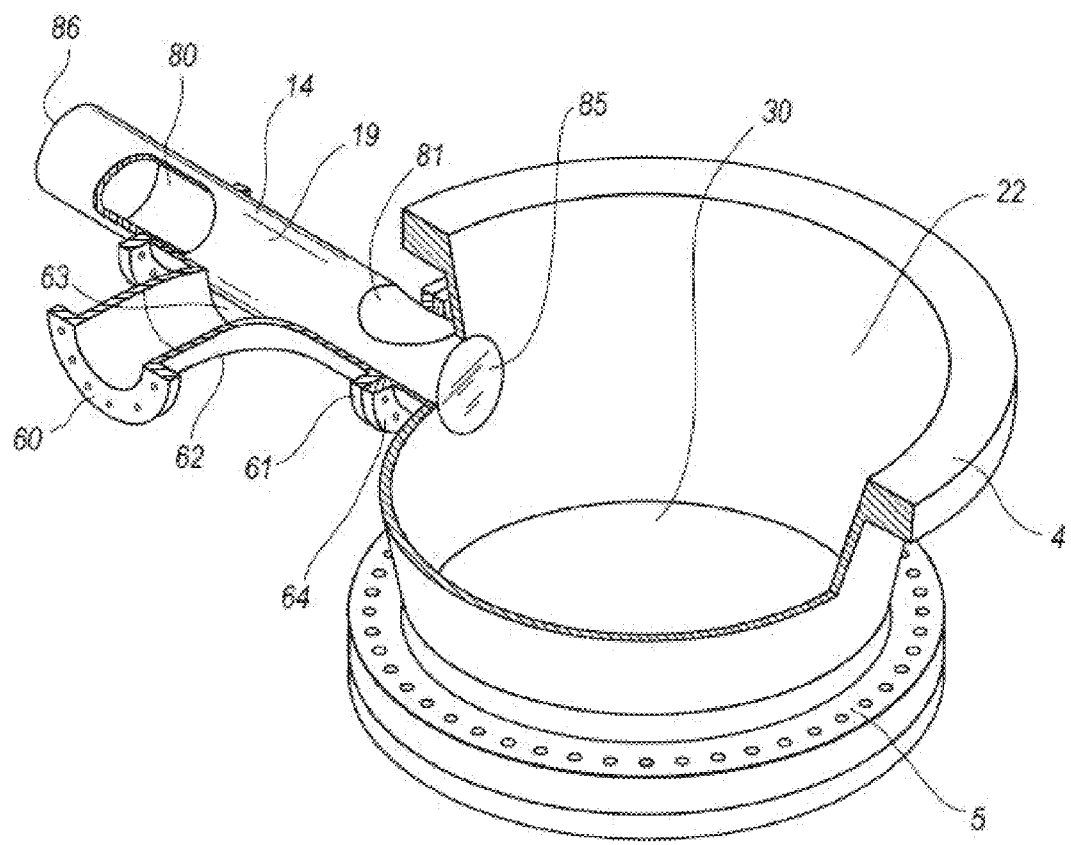
FIG. 4 illustrates a cut-away view of the center feed system of FIG. 3 in a refracted position.
Figure 5:
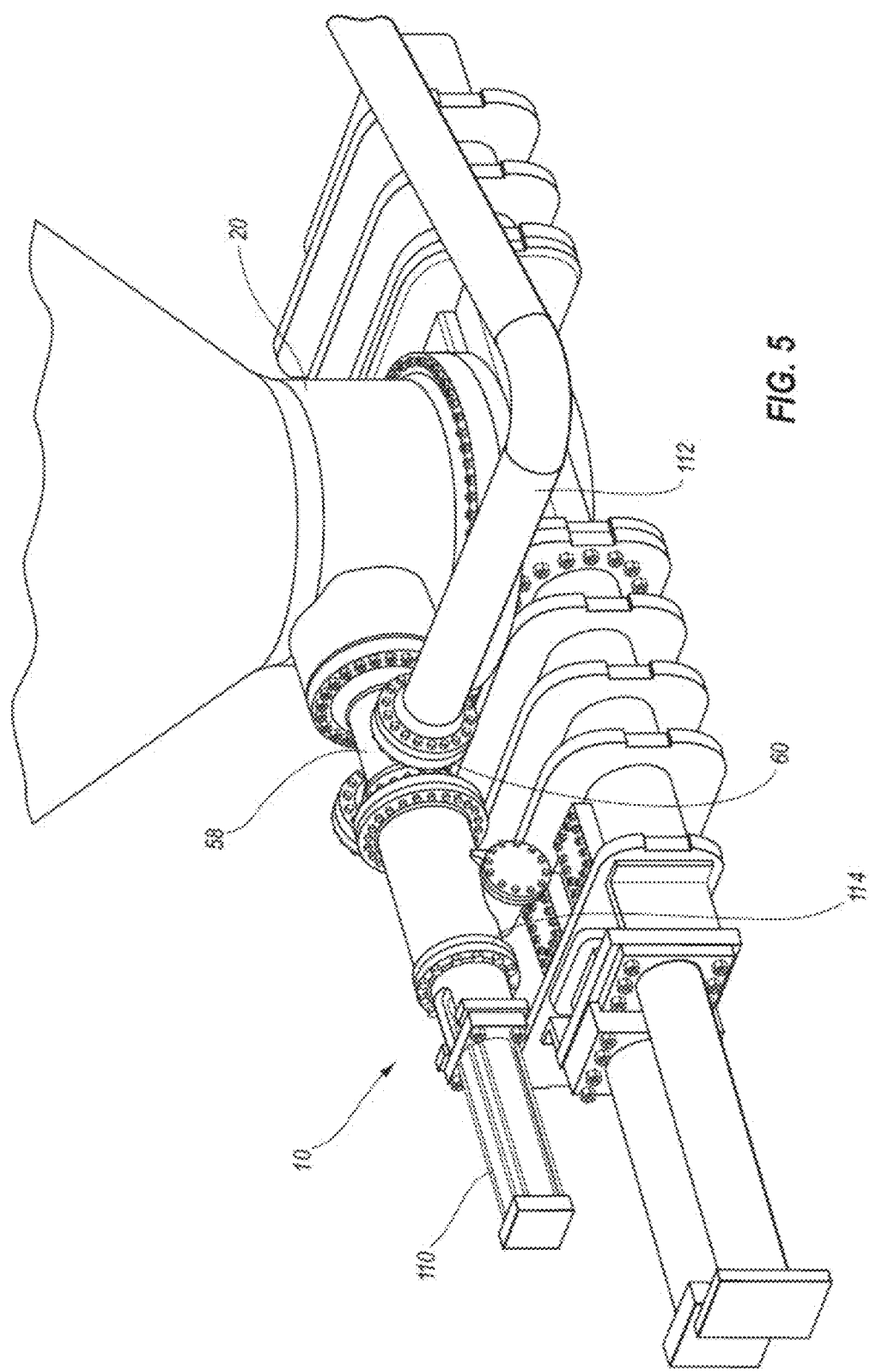
FIG. 5 illustrates a perspective view of a retractable injection nozzle according to an embodiment of the present invention in which the inlet sleeve comprises a four way pipe segment.

The inlet sleeve 58 may comprise a flanged surface 60 proximate to, and being utilized to connect the inlet sleeve 58 to, a feed line 112 (such as is shown in FIG. 5) and may further comprise a second flanged surface 61 for connecting the inlet sleeve 58 to a flanged inlet 64 of spool 20. In some embodiments, the inlet sleeve 58 is designed to hold and be slidably connected to a retractable injection nozzle 14 allowing the injection nozzle 14 to move from an open position, as illustrated in FIG. 3, to a retracted position, as illustrated in FIG. 4. The inlet sleeve 58 may also comprise a third flanged surface 114 for operably connecting the inlet sleeve 58 to an actuator 110 (as shown in FIG. 5).

Inlet sleeve 58 may function to receive the residual byproduct from the feed 112 and extends from flange 60 as shown. In some embodiments, inlet sleeve 58 may integrally form with a curved pipe segment 62 that is shown in FIGS. 3 and 4 to bend approximately 90° or with a pipe segment of a different shape. For example, as illustrated in FIGS. 5, 6 and 7, inlet sleeve 58 may be structured to form a four-way pipe segment. Curved pipe segment 62, or other shaped pipe segment, may also be designed to bend a significant amount less, or more, than is illustrated in FIG. 3 or 4, to accommodate installation of center feed system 10 into preexisting coker operations. For example, should a feed line in a particular coking operation require a more obtuse or acute angle, shaped pipe segment 62 may be designed accordingly. In other embodiments, shaped pipe segment 62 may also accommodate redirection of petroleum byproducts in a vertical axis, as well as the horizontal bend illustrated in FIGS. 3 and 4. In other embodiments, shaped pipe segment 62 may be manufactured to consist of more than on bend, allowing the inlet sleeve 58 to track a curvilinear path required for installation of the center feed system 10. Accordingly, the shaped pipe segment 62 allows the center feed system 10 to be manufactured to retrofit any existing decoking operation, flexibly allowing implementation of a center feed injection system 10 efficiently and with minimal costs for installation.

In some embodiments, each of the feed line, inlet 58, shaped pipe segment 62 and retractable injection nozzle 14 are in fluid connection with one another when the retractable injection nozzle 14 is in a deployed or extended position. When the injection system 10 is in an extended position, residual byproduct may be allowed to travel through and ultimately be deposited within spool 20 or an attached coke drum. Steam, water or other fluids may also be allowed to travel through the center feed injection system during various phases of the delayed cooking process.

When the retractable injection nozzle 14 is in a retracted position as illustrated in FIG. 4, however, feed line inlet 58 and shaped pipe segment 62 may remain in fluid connection with the feed line but flow of residual byproduct through the center feed system into the coke drum is prevented. When retracted, nozzle 14 may block the movement of particulate matter (e.g., coke fines) from entering the system 10 from the vessel as coke is cut away from the interior of the vessel. The retraction of nozzle 14 in some embodiments will occur after the flow of resid through the feed line has been blocked by a valve in the feed line, or the flow may be stopped by interference between inlet sleeve 58 and injector nozzle 14 as the nozzle is retracted, or the retraction of nozzle 14 into inlet sleeve 58 may block the flow through the feed line at a point near bent portion 62.

Alternative structural configurations may be utilized for the inlet sleeve 58. Some examples of alternative structural configurations are shown in FIGS. 5, 6 and 7. As depicted in FIG. 5, an inlet sleeve 58 structurally shaped as a four-way valve may be utilized. As shown in FIGS. 5, 6, and 7, some embodiments of the center feed injection system 10 comprise a spool 20, a retractable injection nozzle 14, and an inlet sleeve 58 designed to operate within a coking system. The inlet sleeve 58 functions to deliver residual byproduct, steam and/or quench fluid to the retractable injection nozzle. The inlet sleeve 58 may comprise a flanged component 60, allowing the inlet sleeve to couple to a feed line 112. As depicted in FIG. 5, feed line 112 may couple to the inlet sleeve 58 via a second flanged surface and may further comprise a third flanged surface 114 for connection to an actuator 110.

As previously mentioned, the modification of the structural shape of the inlet sleeve 58, may be accomplished to provide for adjusted flow characteristics and/or to ameliorate problems associated with the influx of residual byproduct, steam and/or quench fluid into a coking vessel. For example, thermal variances, uneven flow channeling, uneven quench characteristics and other issues experienced may be rectified. Additionally, thermal variance in the center feed system itself may be controlled, while allowing molten hydrocarbon feed stock to flow through the center feed system 10.

FIG. 6 illustrates a cut-away view of an embodiment of a center feed system 10. Center feed system 10 may comprise various configurations of pipe that allow molten resid, steam or quench materials to be fed into a coking vessel. For example, center feed systems 10 may comprise a shaped four-way pipe segment operably connected to a spool 20, and actuator 110. The retractable injection nozzle depicted in FIG. 6 is in an open position with the retractable injection nozzle 14 extended into the interior 30 of the spool 20. The inlet sleeve preferably comprises a flanged surface 60 proximate to, and being utilized to connect the inlet sleeve 58 to a feed line 112 and may further comprise a second flanged surface 61 for connecting the inlet sleeve 58 to the flanged inlet 6 of a spool 20. The inlet sleeve 58 may also comprise a third flanged surface 114 designed to connect the inlet sleeve 58 to the flanged surface of an actuator 110. In some embodiments, the inlet sleeve 58 is designed to hold and slidably connect to a retractable injection nozzle 14, allowing the injection nozzle 14 to move from an open position, as illustrated in FIG. 6, to a retracted position as shown in FIG. 4. Inlet sleeve 58 functions to receive residual byproduct, steam and or quench fluid from the feed line 112. Some embodiments utilize a shaped four-way pipe segment as depicted in FIGS. 5, 6 and 7, to regulate thermal gradients throughout the center feed system 10, due to the balanced symmetry of the center feed system 10 itself.

Regulating thermal gradients within the center feed system 10 itself reduces attendant wear of parts associate with the center feed system 10. For example, further some embodiments of the center feed system 10 may be structured to utilize a pipe system in configurations designed to control flow of resid, steam and/or quench materials through the feed system 10. Accordingly, while a four way pipe segment is depicted in FIG. 6, curved pipe segments depicted in prior FIGS. 3 and 4 and straight pipe segments illustrated in FIGS. 1 and 2, and additional configurations of pipe that allow molten resid, steam and/or quench fluids to be fed into a coking vessel are contemplated.

Center feed system 10 may be constructed from scheduled pipe or cast material to withstand and deliver the high temperature, high-pressure residual byproduct as intended.

Other sizes and materials may be used depending upon the particular end use, and as system requirements dictate. Indeed, although particularly suited to be used within a delayed coking process, the present invention may be utilized in other areas of manufacture, each requiring construction from different materials.

With reference to FIG. 3, as residual byproduct enters the inlet sleeve 58 of center feed system 10 from the feed line, it does so at a high temperature and velocity. Subsequently, the residual byproduct is routed through shaped pipe segment 62. The residual byproduct enters shaped pipe section 62 and encounters inlet 80 of retractable injection nozzle 14. Residual byproduct travels from inlet 80 through the retractable injection nozzle 14, and exits outlet 81.

In some embodiments the control over the injection site and flow of residual byproduct, steam and/or quench fluid being introduced into the interior of the spool and/or vessel may be controlled. For example, the angle of introduction relative to the spool may be controlled. As another example, as residual byproduct enters the interior 30 of the spool 20 and/or vessel, it does so near the center of the spool 20 in a direction preferably comprising a vertical component. In other embodiments, residual byproduct enters the interior 30 the spool 20 from a position other than center of the spool 20, including near the interior surface 30 of the spool itself. As another example, as dictated by the desired flow channeling of a particular system, the center feed system 10 may be utilized to inject byproduct, steam and/or quench fluid into the spool and/or vessel comprising a vertical directional component or any other desired angle.

Control over the injection site and angle of injection may be desirable. For example, the feed into the center of the interior 30 of the spool 20 may be utilized to ensure that the spool and the sidewalls of a coking vessel are exposed to a consistent flow of byproduct. As another example, the controlled flow of molten and/or gaseous residual byproduct from the injection nozzle 14 may ensure that the exposure to molten residual byproduct is consistent across the entire surface area of the interior of the spool 20 and vessel, reducing the potential detrimental effects associated with repetitive thermal cycling. As another example controlled flow of molten residual byproduct from the injection nozzle 14 may ensure control over flow channeling patterns. As another example, quench characteristics and stripping volatile organic compounds from the coke bed may be controlled. Additionally, concerns associated with hot spots in a coke bed may be ameliorated.

With reference to FIGS. 5, 6 and 7, as residual byproduct, steam and or quench fluid enters the inlet sleeve 58 of the center feed system 10 from the feed line 112 the residual byproduct, steam and or quench fluid may be routed through the shaped four-way pipe segment via an inlet sleeve 58, into the inlet 80 of the retractable injection nozzle. A four way pipe allows for inspection of the nozzle 14 (e.g. by allowing inspection through the unused flange) and can be used to access the inside of the nozzle if coke solidifies in the nozzle. A four way pipe also evens out the heat flow and provides a more desirable thermal environment.

With reference to FIGS. 5, 6 and 7, in some embodiments, flow of residual byproduct, steam and/or quench fluids into the spool and/or vessel may be controlled. For example, the residual byproduct, steam and/or quench fluid may be dispensed in a direction comprising a vertical component into spool 20 effectively controlling the injection of residual byproduct, steam and/or quench fluid into the spool and/or vessel. For example, injecting molten resid in a direction comprising a vertical component into the spool and/or vessel may produce a consistent pattern across the inner surface of the spool 20 and/or vessel, rather than impacting only the interior surface of sidewall 22 at a perpendicular or substantially perpendicular manner as found in other designs. Additionally, the control exercised by the injection nozzle 14 of the present invention allows other characteristics associated with filling a vessel with molten resid, steam and/or quench fluids to be affected. For example, uneven flow channeling and hot spots remaining in a coke bed after quenching can be substantially reduced and controlled as the injection patterns and direction of molten resid, steam and/or quench fluids into a vessel are controlled. Nearly vertical or partially vertical dispensing may directly result from the positioning of center feed system 10, the angle of the curved segment of the interior cavity 82 of the retractable injection nozzle 14 and/or the presence of structural obstructive elements interior the center feed system 10. Accordingly, as the residual byproduct, steam and/or quench fluid passes through the retractable injection nozzle 14, into and through inlet 80 and exits outlet 81, the angle of injection of residual byproduct into the spool 20 can be controlled by utilizing different lengths of a retractable injection nozzle 14, by dictating the angle of curve of the curved segment of the interior cavity 82 or by introducing obstructive flow control elements inside the center feed system 10.

The outlet 81 of the retractable injection nozzle may comprise various configurations. FIGS. 8, 9A, 9B, 10A, 10B, 11A and 11B illustrate perspective views of alternative outlets 81. As depicted in FIGS. 9A and 9B, outlet 81 comprises two openings 120, each of the two openings comprising a tapered collar 125. The tapered collar 125, associated with each of the two openings 120, may be designed with alternative structural configurations. As illustrated in FIGS. 9A and 9B, the first tapered collar 126 may extend into the interior cavity 88 of the injection nozzle 14 a distance less than the second tapered collar 127. Accordingly, altering the shape of the inlet opening 81, utilizing collars or other structural flow control structures, modifying the shape of the collars or other flow control structures may affect the flow of residual byproduct, steam and or quench fluid through the retractable injection nozzle 14 and co-commitantly affects the flow of residual byproduct, steam and or quench fluid into the vessel and spool. As illustrated in FIGS. 9A and 9B, each collar may comprise a collar outlet 128, a collar inlet 130 and a collar body 132. Each of the collar inlet 130, collar outlet 128 and collar body 132 may be structurally modified to accomplish control of flow of residual byproduct, steam and or quench fluid through the center feed system.

Additionally, the outlet 81 of the retractable injection nozzle 14 may be fitted with a flow control device. In some embodiments, a flow control device comprising a series of holes or perforations at the outlet 81 may be utilized to alter the flow of molten resid from the outlet. For example, a flow control device could be utilized to modify the laminar nature of the flow of the molten resid from the outlet. Similarly, flow control devices may be used at various points in the center feed system 10 to alter the flow of molten resid through the center feed system 10. For example, one or more flow control device(s) may be utilized to modify the laminar nature of the flow of resid, steam and/or quench fluid through the system, or to alter the nature of flow through the center feed system 10 in a desirable fashion.

In some embodiments residual byproduct exits the outlet 81 which has been structurally modified to accomplish control of flow of residual byproduct through the center feed system and into a coking vessel. In some embodiments residual byproduct exits the injection nozzle 14 in a direction that comprises a vertical component. In some embodiments, residual byproduct exits the outlet 81 at roughly a 90° angle relative to the entrance point on a side wall 22. As such the residual byproduct is not directed towards the opposite side of the vessel or spool 20. Alternatively, injection system 10 may be designed to introduce molten resid, steam and/or quench fluid into the vessel at about a 85°, 80°, 75°, 70°, 65°, 60°, 55°, 50°, 45°, 40°, or 35° angle relative to the entrance point on a side wall 22. Alternatively, system 10 may be designed to introduce molten resid steam and/or quench fluid into the vessel at about a 95°, 100°, 105°, 110°, 115°, 120°, 125°, 130°, 135°, 140° or 145° angle relative to the entrance point on a side wall 22.

In some embodiments, the particular angle of curved segment of interior cavity 82 and length of retractable injection nozzle 14 may vary depending upon system requirements and the size and dimensions of the vessels in which the material is being deposited. In a preferred embodiment, curved segment of interior cavity 82 comprises an angle between 0 and 90° to correspond to the range of angle desired within a particular coking vessel. In some embodiments, the curved segment of interior cavity 82 lies between 60 and 90°, effectively producing a vertical or nearly vertical spray of residual byproduct, steam and/or quench fluid exiting outlet 81, filling spool 20 and vessel in a desired fashion. Alternatively, embodiments may utilize a curved segment of the interior cavity 82 with between 30 and 60° angle relative to the point of entry inside the spool 20 producing a substantially vertical spray of residual byproduct into the spool 20 and coking vessel.

In some embodiments, a shorter retractable injection nozzle 14 may be used. Further the shorter retractable injection nozzle 14 may be utilized in conjunction with a curved segment of an interior cavity 82, such that the shortened length of the retractable injection nozzle is coupled with a curved segment of the interior cavity 82 with an angle designed to spray residual byproduct into the desired point in the interior of the coke drum. Alternatively, some embodiments utilize a longer retractable injection nozzle 14 placing the outlet 81 of the retractable injection nozzle 14 directly in the center of the spool 20 or even extending beyond the center of the spool 20. The longer retractable injection nozzle may be utilized in coordination with a more vertical curve in the curved segment of the interior cavity 82, such that the residual byproduct would be delivered directly at or near the center of the vessel and spool 20, or to the desired spot within the interior of the spool 20 to control the flow of residual byproduct, steam and/or quench fluid into the spool 20 and/or vessel.

FIGS. 3 and 4, for example, depict embodiments of the present invention in which a segment of retractable nozzle 14 is utilized that has insufficient length to extend the outlet 81 of the retractable injection nozzle 14 to the center of the spool 20. In accord with the desire to control the flow of residual byproduct and attendant filling of the spool and vessel, the angle of the curved segment of the interior cavity 82 may be adjusted appropriately to result in a spray of residual byproduct, steam and/or quench fluid being propelled with the desired angle of entry and velocity into the vessel. As such, various embodiments may further comprise use of different angles for the curved segment of the interior cavity 82 of the retractable injection nozzle 14 and also use of various lengths of the straight section 19 of the retractable injection nozzle 14 to ensure that the desired control over the flow of resid is exercised.

Further, some embodiments alter both the angle of the curved segment of the interior cavity 82 as well as the length of the straight section 19 of the retractable injection nozzle 14 to accommodate viscosity, velocities and temperature gradients of residual byproduct being pumped to the retractable injection nozzle 14.

Insert sleeve 58 and retractable injection nozzle 14 may comprises a uniform cross sectional area and/or interior diameter, or may comprise varying cross sectional areas or diameters. Designing the center feed system 10 to comprise varying cross sectional areas or diameters allows the center feed system 10 to provide for, and accommodate, varying volumes and velocities of residual byproducts, steam and/or quench fluid to be transported through the system, as well as to help control the flow of residual byproducts, steam and/or quench fluid for delivery within the spool 20.

The outlet 81 of the retractable injection nozzle 14 may also be constructed to be elliptical in design so as to accommodate material as it passes from the outlet 81 into the spool 20 and vessel. In various embodiments, the shape of the outlet 81 may be modified to accommodate various velocities and viscosities and material types being passed through the retractable injection nozzle 14. Additionally, the shape and size of the opening may be modified to control the spray pattern and flow characteristics of material and/or fluid ejecting from the outlet 81 of the retractable injection nozzle. For example, a larger outlet 81 may be used to reduce the velocity of residual byproduct material exiting the retractable injection nozzle 14. In other embodiments, a smaller outlet 81 may be used to produce a stream of higher velocity residual byproduct entering the spool 20 and vessel. In this fashion, the pattern of molten residual byproduct being ejected from the retractable injection nozzle 14 may be controlled, which increases longevity of vessels and spools, increases safety, improves yield of volatile organic compounds and effectively reduces the amount of downtime necessary for maintenance and repair.

FIG. 4 illustrates a cut away view of a spool 20, and center feed system 10 in a refracted position. During the process of delayed coking, residual byproduct is fed into the spool 20 and vessel until the vessel is completely or nearly filled. Once the desired level of residual material has been fed into the vessel, the flow of residual byproduct may be mixed with steam so that residual byproduct and steam flow into the vessel simultaneously, the ratios of residual byproduct and steam may be altered to increase yields of volatile organic compounds or to produce other desired effects. Additionally, the amount of steam relative to the amount of residual byproduct may be increased or decreased over time as a particular vessel fills. Once a vessel is full, the flow of residual byproduct may be stopped. In typical prior art decoking processes, the vessel is then quenched with water effectively cooling and hardening the residual byproduct. According to some embodiments of the present invention, the inlet sleeve 58 and retractable injection nozzle 14 may be utilized to pump steam and/or water into the spool 20 and vessel, effectively purging the inlet sleeve 58 and retractable injection nozzle 14 of any remaining residual byproduct and/or to allow for quenching of the vessel and its contents. This effectively clears the inlet sleeve 58 and retractable injection nozzle 14, and simultaneously quenches the vessel, reducing the amount of time and water utilized to quench the vessel. In preferred embodiments, once the inlet sleeve and retractable injection nozzle 14 have been purged with steam and/or water, the retractable injection nozzle 14 may be retracted as shown in FIG. 4.

Various methods for retracting the retractable injection nozzle 14 may be utilized according to embodiments of the present invention. In some embodiments, an actuator 110 may be attached to the first end of the retractable injection nozzle 86. The actuator 110 may be used to apply force to the retractable injection nozzle 14, effectively retracting the retractable injection nozzle 14 from the interior of the spool 30. As depicted in FIG. 4, the second end 85 of the retractable injection nozzle 14 then effectively forms a portion of the interior surface wall 22 of the spool 20. Retracting the injection nozzle 14 after a vessel has been filled, quenched and the inlet sleeve and retractable injection nozzle 14 have been purged, allows for subsequent removal of the hardened carbonaceous matter from a coking vessel, utilizing one of various techniques known in the art, without the risk of clogging the center feed system with coke fines or other particulate matter.

Typically, the hardened carbonaceous material is cut away from the interior of a vessel utilizing a high pressure water drill. As the solid carbonaceous material is cut away from the interior of the vessel, it falls though a port in the bottom of the vessel through the interior 30 of the spool 20 to an area below the vessel commonly referred to as the chute, where it is collected and discarded or utilized for subsequent purposes.

The process of delayed coking, and particularly the steps of directing a residual byproduct into an inlet from a feed source and allowing the residual byproduct to be dispensed or disposed within the vessel, comprises utilizing a dispenser that functions to dispose or direct the byproduct into the vessel.

As a feed line is attached to inlet 6, the residual byproduct in the feed line is received through opening 8 in inlet 6, routed through the pipe structure of inlet 6, and dispensed or disposed within vessel 2. During the fill cycle and/or once the vessel is full, steam may be piped through the inlet system into the vessel. Steam clears the inlet system 10 and strips the coke of valuable hydrocarbon byproducts, which are allowed to escape through the overhead feed line where they are typically routed to fractionators. Once all of the valuable hydrocarbon byproducts have been stripped from the coke resident in the vessel, steam is pumped into the vessel and released through an outlet to the blow down recovery area until the drum temperature of the vessel and its contents reaches approximately 500° F. Typically thereafter, water is pumped into the vessel through the inlet system and released into the blow down area until the contents of the vessel reach approximately 200° F. Once quenched the deheader valves are opened and the process of cutting coke from the interior of the vessel begins.

Figure 1:
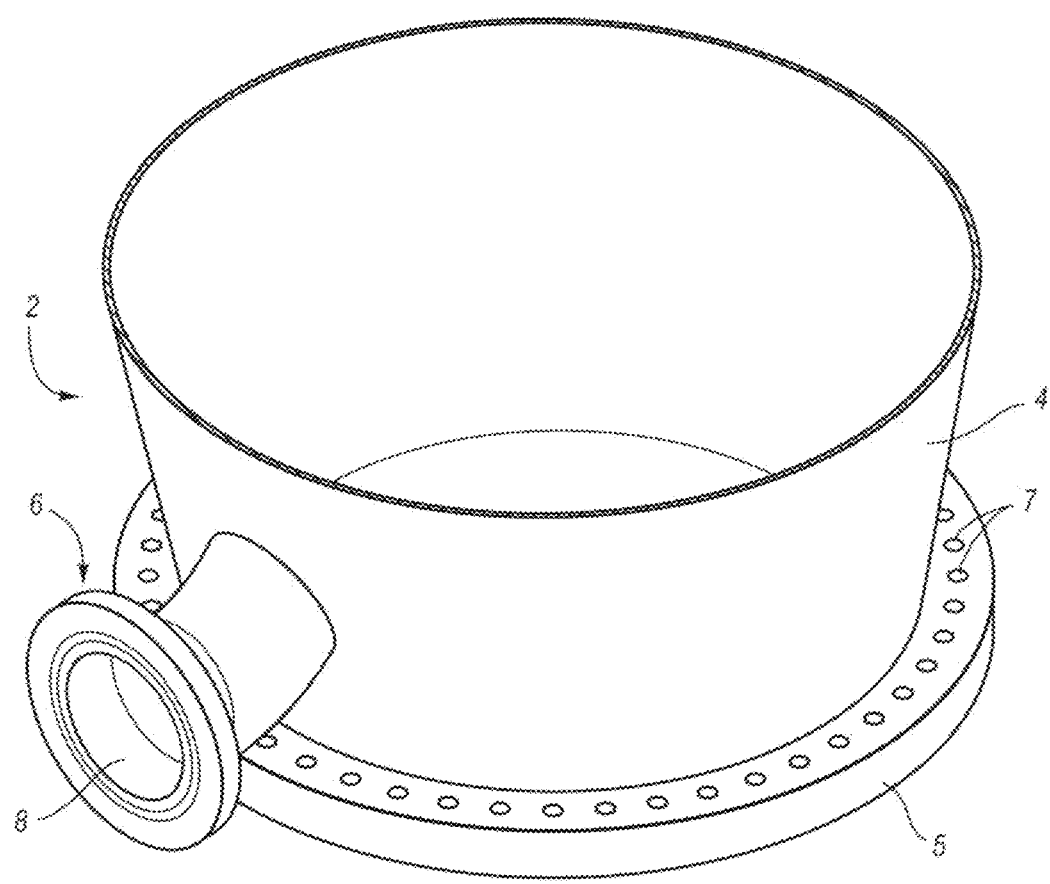
FIG. 1 illustrates a prior art dispensing system that employs a single inlet.
Figure 2:
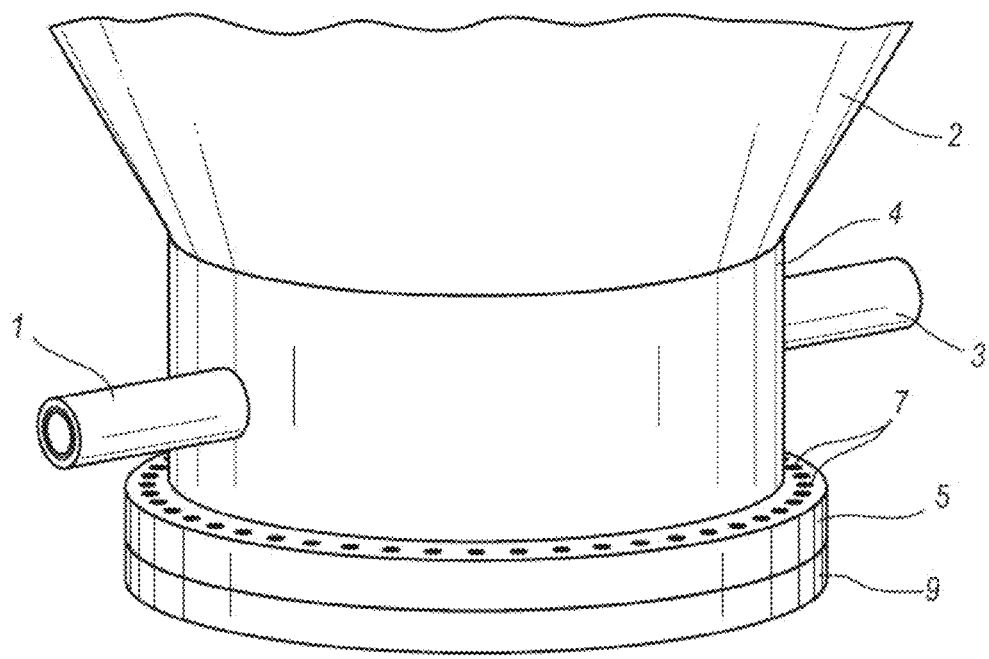
FIG. 2 illustrates another prior art dispensing system that employs multiple inlets.

The simple design depicted in FIG. 1 may create problems as coke is cut away from the interior of the vessel. Because the inlet 6 remains open in the simple system, coke fines and particulate matter would be allowed to accumulate in the inlet system, effectively clogging the inlet system. To ameliorate the clogging issue, some operations allow water to flow through the inlet system during the entire cutting process to ensure that the inlet system remains unclogged. In some operations 400-1000 gallons of water per hour are pumped through the inlet system during the cutting process to ensure that the inlet system remain unclogged.

Because some embodiments of the center feed system utilize a retractable injection nozzle as depicted in FIGS. 3-7, the retractable injection nozzle is not exposed to solid carbonaceous particles as they fall from the vessel to the chute below, effectively reducing clogging and/or damage that could be caused to the injection nozzle if allowed to remain exposed to the falling solid carbonaceous matter. Alternatively, the present invention contemplates utilizing a fixed injection nozzle with a slidable closure, which could be utilized to cover the outlet 81 of the fixed injection nozzle after a heating cycle but before the vessel is decoked. Alternatively, the invention contemplates utilizing a injection nozzle, which is connected to an actuator that would apply a tortional force to the injection nozzle once the vessel has been filled to a desired level with residual byproduct, such that the outlet 81 of the injection nozzle would point down, reducing the opportunity for solid carbonaceous material to pack into and clog the injection nozzle without effectively having to retract the nozzle itself from the interior 30 of a spool 20. However, in preferred embodiments, and as illustrated in FIGS. 3 and 4, a retractable injection nozzle 14 is utilized.

In addition to effectively sealing inlet 6 of the spool 20, the retractable injection nozzle 14 seals the opening in the curved pipe segment 63 blocking the flow of matter and/or fluid from inlet feeds 3. Once the solid carbonaceous material has been removed from the interior of the vessel by means utilized in the art, the vessel is clear and ready to be filled with additional residual byproduct. At a desired time, the retractable injection nozzle could then be moved to an open position as illustrated in FIGS. 3 and 5-7, reopening the passageway from the inlet sleeve 58, through the inlet 80, through the retractable injection nozzle 14 and to the outlet 81, allowing a subsequent cycle of residual byproduct to be pumped into the vessel. In this fashion, the process of filling, quenching and removing solid carbonaceous material from a coker vessel may be accomplished repetitively, with minimal damage to the coker vessel and spool of a delayed coker unit system.

Figure 8:
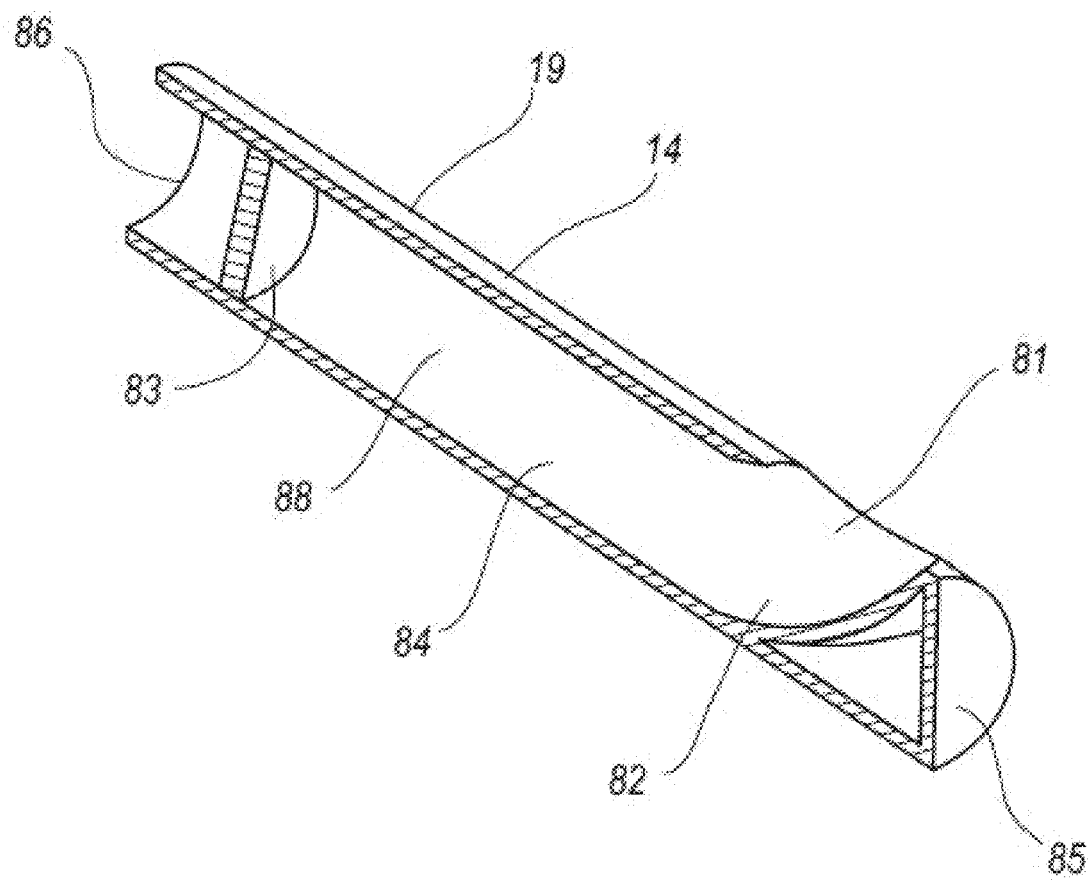
FIG. 8 illustrates a cut-away perspective view of a retractable injection nozzle according to one exemplary embodiment of the present invention.
Figure 9A:
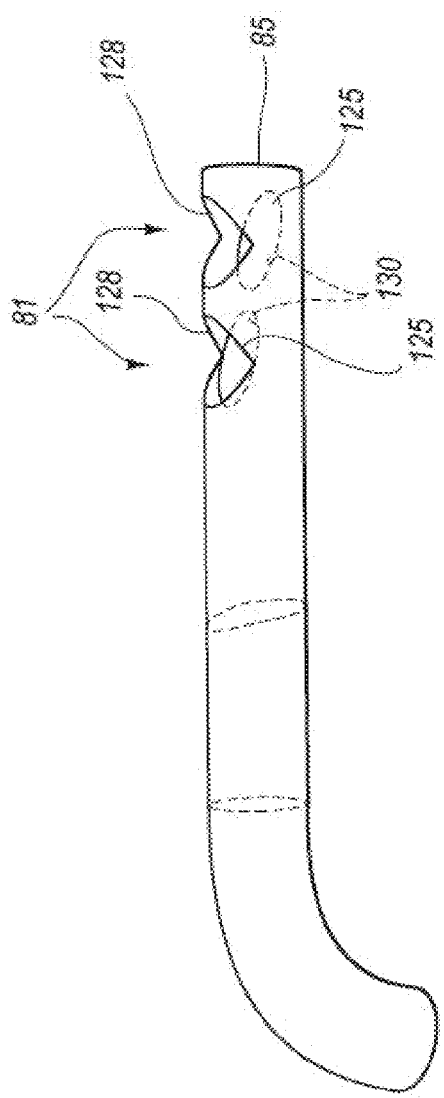
FIGS. 9A and 9B illustrate a perspective view of a retractable injection nozzle according to one embodiment.
Figure 9B:
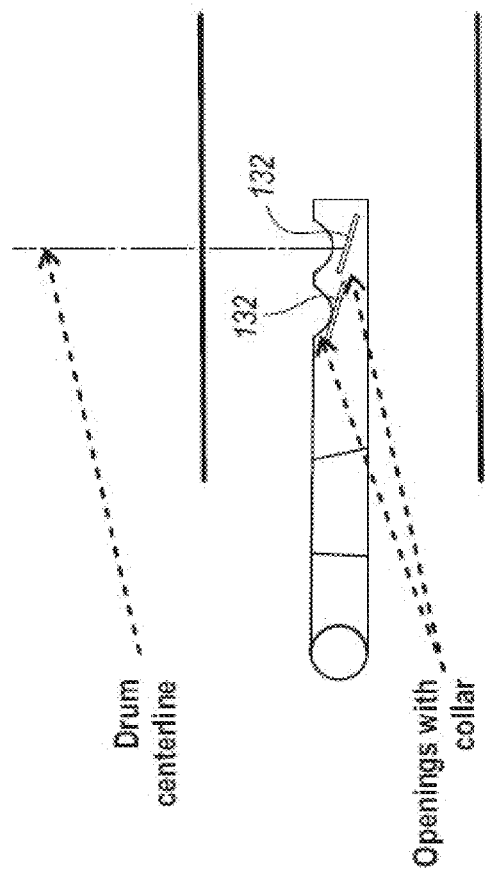

FIG. 8 illustrates a cut away view of an injection nozzle, which may be a retractable injection nozzle 14. The depicted retracted injection nozzle, as utilized according to some embodiments of the present invention, comprises a first end of the retractable injection nozzle 86, an interior cap 83, an interior cavity 88, a straight segment of the interior cavity 84, a curved segment of the interior cavity 82, a second end of the retractable injection nozzle 85, and a straight section of the retractable injection nozzle 19. In preferred embodiments, the retractable injection nozzle 14 is structured as shown to allow the entire retractable injection nozzle 14 to slidably engage the straight portion of an inlet sleeve 58, aligning an inlet 80 with the inlet sleeve 58 and exposing the outlet 81 of the retractable injection nozzle 14 to the interior of a vessel, effectively allowing residual byproduct to flow through the inlet sleeve 58 and retractable injection nozzle 14 from the outlet 81 into a vessel. As noted previously, the angle of the curved segment of the interior cavity 82 may be modified to adjust the flow characteristics of the residual byproduct, steam and/or quench fluid into the vessel as desired. Additionally, the shape and size of the outlet 81 may be modified as desired to produce desirable flow patterns of residual byproduct, steam and/or quench fluid into a vessel. Additionally, the length and diameter of the straight section 19 of the retractable injection nozzle 14 may be modified as desired to produce the desired flow of residual byproduct, steam and/or quench fluid through the injection nozzle 14 itself and into the interior of a spool 30 and vessel.

The first end of the retractable injection nozzle 86 may be structured to provide attachment to an actuating means, allowing the retractable injection nozzle 14 to interchangeably be moved to an open or retracted position to allow for subsequent cycles of coking and decoking of a vessel. Various actuator means are contemplated by the present invention. For example, electric actuating means, hydraulic actuating means, pneumatic actuating means and manual actuating means may all be utilized in accord with various embodiments of the present invention. One skilled in the art would appreciate that other actuating means are available and may be utilized in conjunction with the present invention to effect the desirable control over the opening and retracting of the injection nozzle 14 itself.

The present invention contemplates that the shape of the retractable injection nozzle 14 will conform to the interior cavity of the inlet sleeve. While depicted with a circular cross section in FIGS. 3-7, it is contemplated that the cross sectional shape of the interior of the inlet sleeve 58 and co-commitant shape of the retractable injection nozzle 14 itself may vary from circular. For example, the retractable injection nozzle may be structured to have an elliptical cross section. Altering the shape of the cross section of the retractable injection nozzle 14 may be desirable to alter flow characteristics and ejection pattern of residual byproduct. Different flow consistencies and velocities may dictate further that the interior cavity 88 of the retractable nozzle 14 as well as the interior cavity 88 of the inlet sleeve 58 structured to have disparate cross sections throughout the length of the straight section 19 of the retractable injection nozzle 14. For example, in some embodiments it is desirable to use, as shown a roughly cylindrical and straight interior cavity 88, while in other embodiments it is desirable that the interior diameter of the interior cavity 88 progressively increase or decrease along the length of the straight section 19 of the retractable injection nozzle 14 from the first end 85 of the retractable injection nozzle 14 to the second end 86 of the retractable injection nozzle 14, effectively decreasing or increasing resistance applied to the residual byproduct as it flows through the retractable injection nozzle 14.

As noted previously, the size and shape of the inlet 80 and outlet 81 may be altered to conform, as is the case, with inlet 80 with the shape of the interior of the inlet sleeve 58 at the curved pipe segment 63, allowing for fluid passage of residual byproduct through the inlet sleeve 58 and injection nozzle 14 without encountering resistance of obtrusive structural elements.

FIGS. 8, 9A, 9B, 10B and 11A, 11B each illustrate some embodiments of an injection nozzle 14. The depicted retractable injection nozzle 14 may comprise a first end of the refraction nozzle 86, an interior cap 83, an interior cavity 88, a straight segment of the interior cavity 84, a second end of the retractable injection nozzle 85, at least one opening 120 and in some embodiments, multiple openings 120, a tapered collar 125, wherein the tapered collar may comprise various elements including a collar outlet 128, a collar inlet 130, and a collar body 132. In some embodiments, the retractable injection nozzle 14 is structured as shown to allow the entire retractable injection nozzle 14 to slidably engage the straight portion of the inlet sleeve 58 aligning an inlet 80 with an inlet sleeve 58 and exposing the outlet 81 of the retractable injection nozzle 14 to the interior of the vessel, effectively allowing residual byproduct, steam and or quench fluid to flow through the inlet sleeve 58 and retractable injection nozzle 14 from the outlet 81 into a vessel.

Figure 10A:
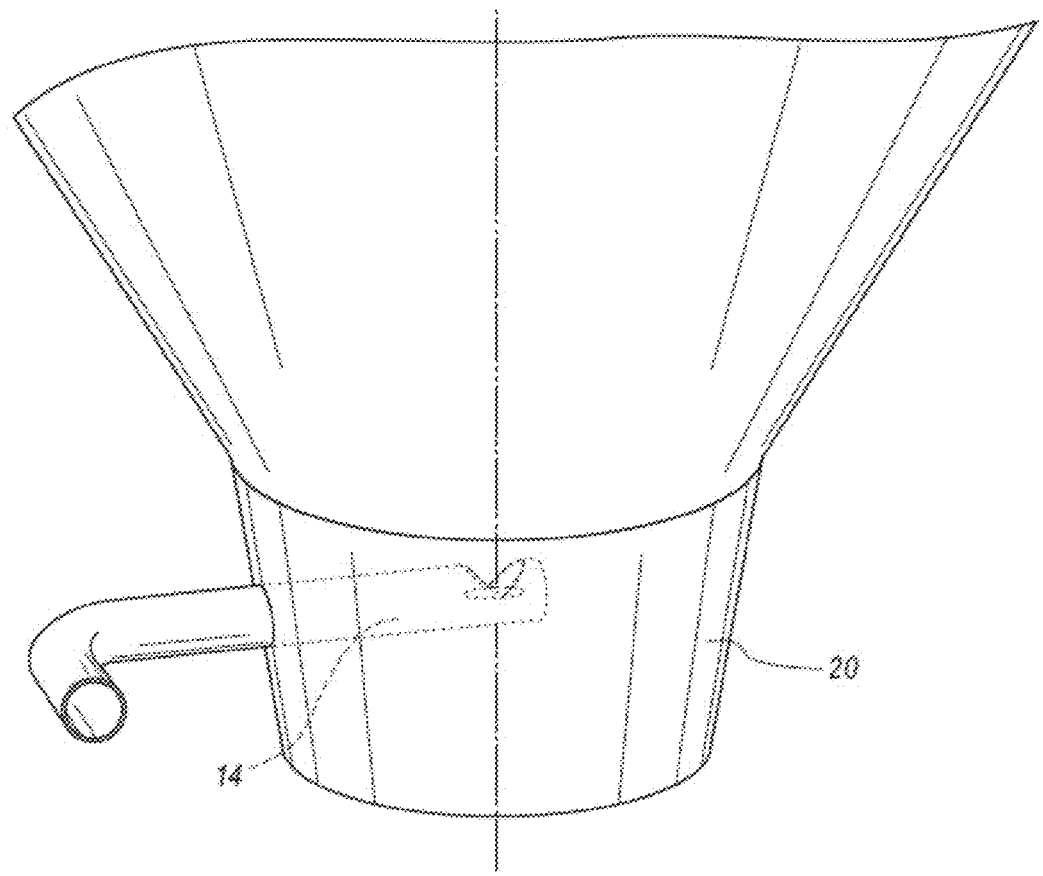
FIGS. 10A and 10B illustrate a perspective view of a retractable injection nozzle according to an embodiment.
Figure 10B:
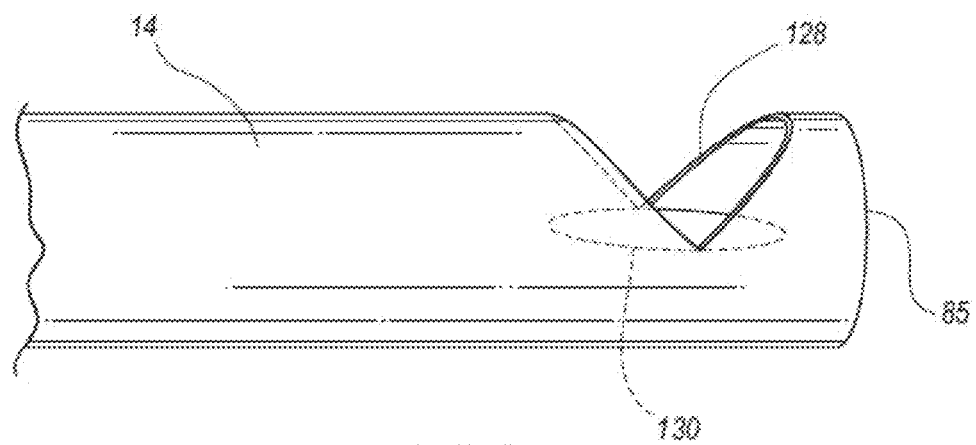

As previously noted, the use of multiple openings and a collar or other flow control apparatus may be utilized as desirable to produce desirable flow patterns of residual byproduct, steam and or quench fluid into a vessel. As depicted in FIGS. 6, 7, 9A and 9B, embodiments of the invention may utilize two outlets 81 disposed in a linear fashion on the top of the retractable injection nozzle 14, allowing the residual byproduct, steam and or quench fluid to be injected upward, or at another desired angle, into a vessel. As depicted, the use of tapered collars 125 may also be utilized to alter flow patterns. Alternatively, as depicted in FIG. 10A and 10B, a collared outlet 128 may be utilized in conjunction with a collar body 132 that is not tapered.

As depicted in FIGS. 6 and 7, the first end of the retractable injection nozzle 86 may be structured to provide attachment to an actuating means, allowing the retractable injection nozzle 14 to interchangeably move between an open and retracted position to allow for subsequent cycles of coking and decoking a vessel. Various actuator means and structures are contemplated by the present invention. As previously noted, examples of contemplated actuators include electric, hydraulic, pneumatic and manual actuating means or structures.

The retractable injection nozzle 14 may be structured to conform to the interior cavity of the inlet sleeve. As depicted in FIGS. 6 and 7, the retractable injection nozzle is designed with a circular cross section and is used in conjunction, as shown, with collar outlets 128 with circular cross sections, as well as collar bodies with circular cross sections. While each of these listed constitutive elements of the retractable injection nozzle 14 are depicted with circular cross sections, it is contemplated that alternative cross sectional shapes may be utilized. For example, the collar outlet 128 and collar body 132 may be structured to have elliptical cross sections. Altering the shape of the cross section of the retractable injection nozzle 14, the interior cavity 88, the straight segment of the interior cavity 84, the collar 125, whether tapered or not, the collar outlet 128, the collar inlet 130 and the collar body 132, may be desirable to alter flow characteristics and injection patterns of residual byproduct. Different flow consistencies and velocities may dictate further that the various listed constitutive elements of the retractable nozzle 14 have disparate cross sections throughout the length of the section. For example, as shown in FIGS. 6 and 7, the interior cavity 88 has a cross section, which changes as residual byproduct, steam and or quench fluid flows from the first end of the retractable injection nozzle 86 to the second end of the retractable injection nozzle 85. The utilization of multiple collared outlets substantially tapers the cross sectional view of the interior cavity 88 of the retractable injection nozzle 14.

Different flow consistencies and velocities may dictate further that the various constitutive elements of the retractable injection nozzle be structured to utilize different cross sectional shapes. For example, as illustrated in FIGS. 6 and 7, the tapered collar inlet 130 is structured with an elliptical cross sectional shape, while the collar body itself is structured with a circular cross sectional shape. Accordingly, in some embodiments it is desirable to use, as shown in FIGS. 1-5, roughly cylindrical and/or straight interior cavities 88, while in other embodiments, it may be desirable that the interior diameter of the interior cavity 88 progressively increase or decrease along the length of the straight section 19 of the retractable injection nozzle 14 from the first end 85 of the retractable injection nozzle 14 to the second end 86 of the retractable injection nozzle 14, effectively decreasing or increasing resistance applied to residual byproduct, steam and or quench fluid as it flows through the retractable injection nozzle 14.

As previously noted, the size and shape of the inlet 80, 130 and the outlet 81, 128 may be altered to conform with the inlet 80, 130 with the shape of the interior of the inlet sleeve 58, allowing fluid passage of residual byproduct, steam and or quench fluid through the inlet sleeve 58 and injection nozzle 14, without encountering resistance of obtrusive structural elements. Alternatively, obtrusive structural elements or flow control structures may be utilized to alter the flow patterns of residual byproduct, steam and or quench fluid through the retractable injection nozzle 14 into the interior of the vessel. As depicted herein, various obstructive features are contemplated.

As depicted herein, the use of tapered collars, which intrude into the interior cavity 88 of the retractable injection nozzle are utilized both to simultaneously alter the cross sectional shape of the interior cavity 88 of the retractable injection nozzle 14 itself, and to control the path of flow of residual byproduct, steam and or quench fluid into the interior of a vessel. Alternatively, non-tapered collars 134 may be utilized.

As depicted in FIGS. 10A and 10B, various collar shapes and angles of the collar relative to the interior cavity 88 of the retractable injection nozzle may be utilized. For example, the collar as depicted in various figures is disposed at a right angle relative to the straight segment of the interior cavity 84 of the retractable injection nozzle 14. However, it is contemplated that collars may be disposed at some angle relative to the straight segment of the interior cavity 84 other than a right angle. For example, it is contemplated that a collar may be utilized in conjunction with the embodiment depicted in FIG. 5 such that the collar would be disposed at an obtuse or acute angle relative to the flow of byproduct through the straight segment of the interior cavity 84.

In addition to altering the angle at which the collar body 132 is disposed relative to the flow of fluid through the straight segment of the interior cavity 84, it is contemplated that various shapes for collar outlets may be utilized. As depicted in FIGS. 10A and 10B, alternative cross sections to the collar outlet 128 may be utilized in order to alter flow characteristics and injection patterns of residual byproduct, steam and or quench fluid. Additionally, as indicated in FIGS. 10 and 11, both the collar outlet 128 and angle of the collar body 132 may be altered relative to their position in relation to the drum center line or the axis of the drum.

Figure 11A:
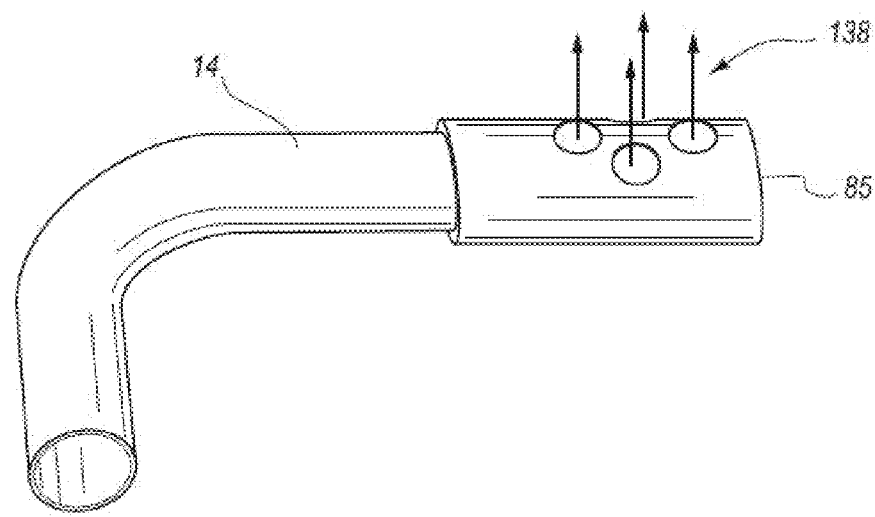
FIGS. 11A and 11B illustrate a perspective view of retractable injection nozzles according to embodiments of the present invention.

Alternative obstructive elements and flow control structures may be utilized. For example, FIG. 11A depicts the use of multiple outlets 138, each of which may be coupled with the use of a collar 125, 134, collar outlets 128, collar inlets 130 and collar body 132. Alternatively, the multiple outlets 138 may be associated with a singular collar, or may comprise an outlet for a single collar and be associated with a single collar 125, 134 and collar body 132, such that the flow of residual byproduct, steam and or quench fluid through the retractable injection nozzle is guided through a single collar body 132 but is ejected into the vessel from multiple outlets 138.

Figure 11B:
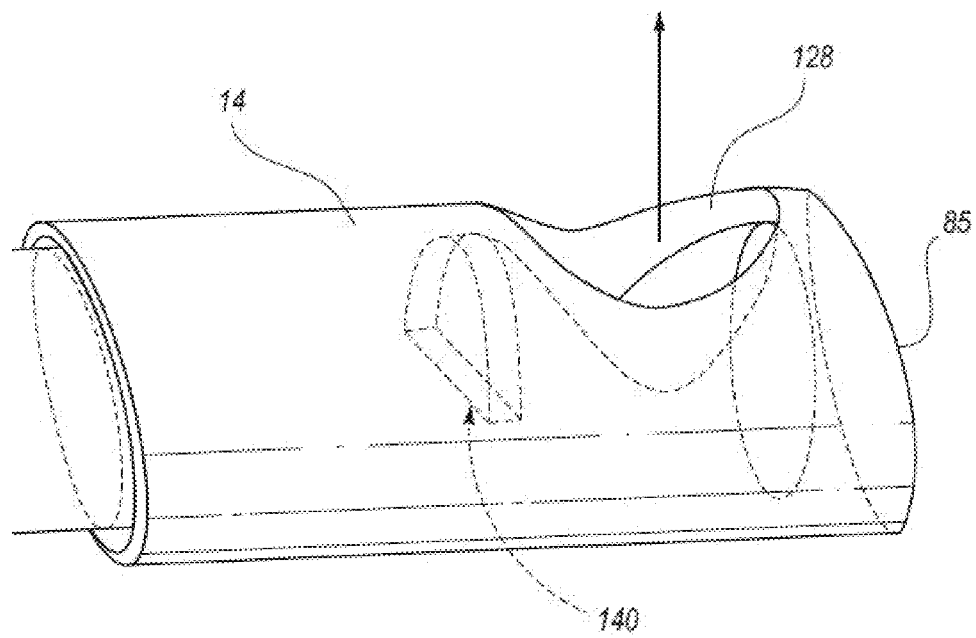

As another example, FIG. 11B illustrates the use of a baffle 140 as an obstructive element placed nearer the first end of the retractable injection nozzle 86 than the nozzle opening 81. Accordingly, a baffle 140 or multiple baffles 140 may be utilized to alter flow characteristics and injection patterns of residual byproduct, steam and or quench fluid from an outlet 81. Various forms of outlets 81 may be utilized in conjunction with baffles 140 and it is contemplated that each of the outlet 81 designs discussed herein may be utilized in conjunction with a baffle 140 or multiple baffles 140.

It should be noted that the present invention center feed system 10 and dispenser system can be used with or coupled directly to a coke drum, eliminating the use of a spool 20 section. In this embodiment, the center feed system 10 and system would function as described above, only the residual byproduct would be dispensed directly into the coke drum.

FIGS. 12A-12G provide various views of a center feed system to summarize the general functionality of a retractable injection nozzle according to one or more embodiments of the invention. The retractable injection nozzle depicted in FIGS. 12A-12G is similar to the retractable injection nozzle of FIG. 3. However, the same general functionality can be provided by other configurations of a retractable injection nozzle such as the retractable injection nozzle depicted in FIG. 5.

Figure 12A:
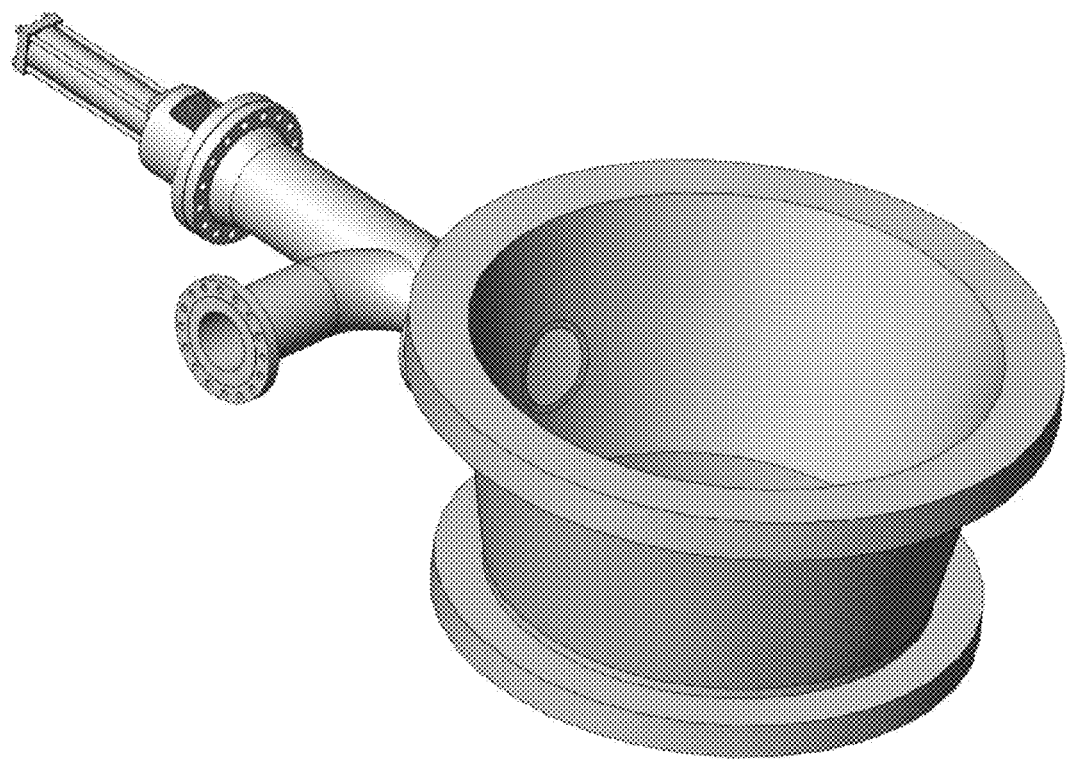
FIGS. 12A-12G illustrate perspective views of a center feed system according to embodiments of the present invention.

FIG. 12A illustrates a perspective view of the center feed system when the refracted injection nozzle is in a retracted position within the inlet sleeve. The retractable injection nozzle may be in this position while coke is being cut and removed from the coke drum.

Figure 12B:
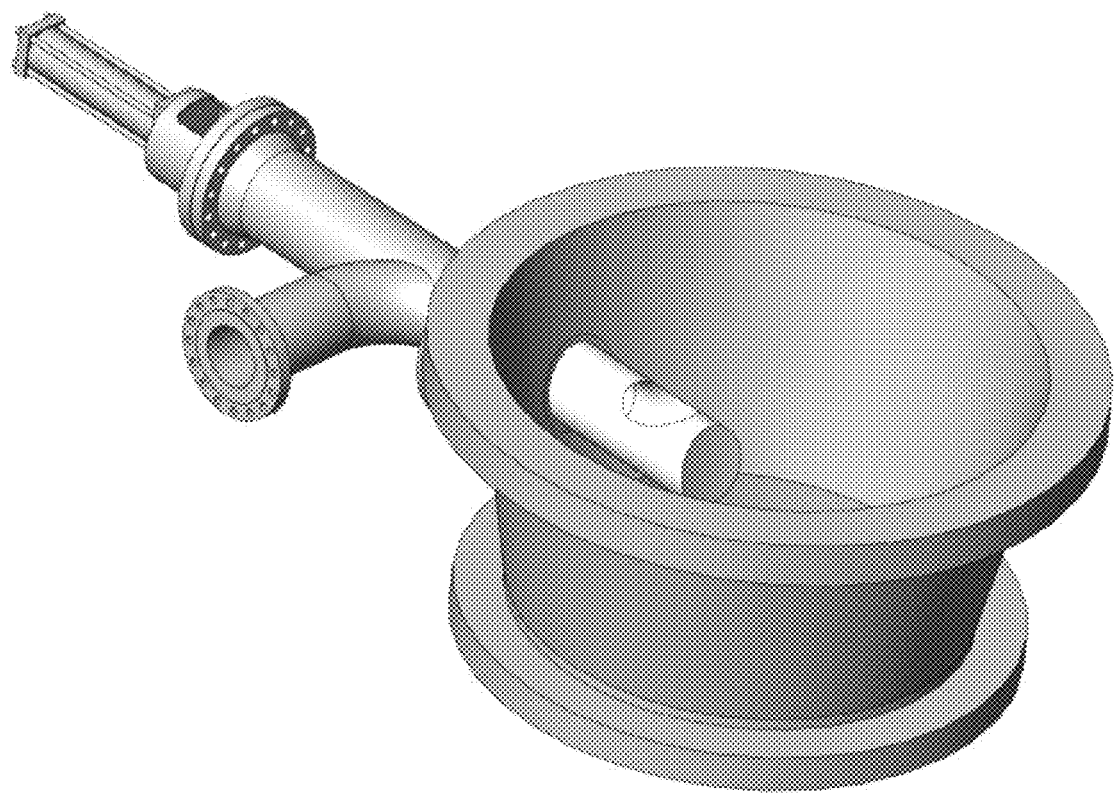

FIG. 12B illustrates a perspective view of the center feed system when the retractable injection nozzle is in an extended position. The retractable injection nozzle may be in this position while byproduct is being injected into the coke drum.

Figure 12C:
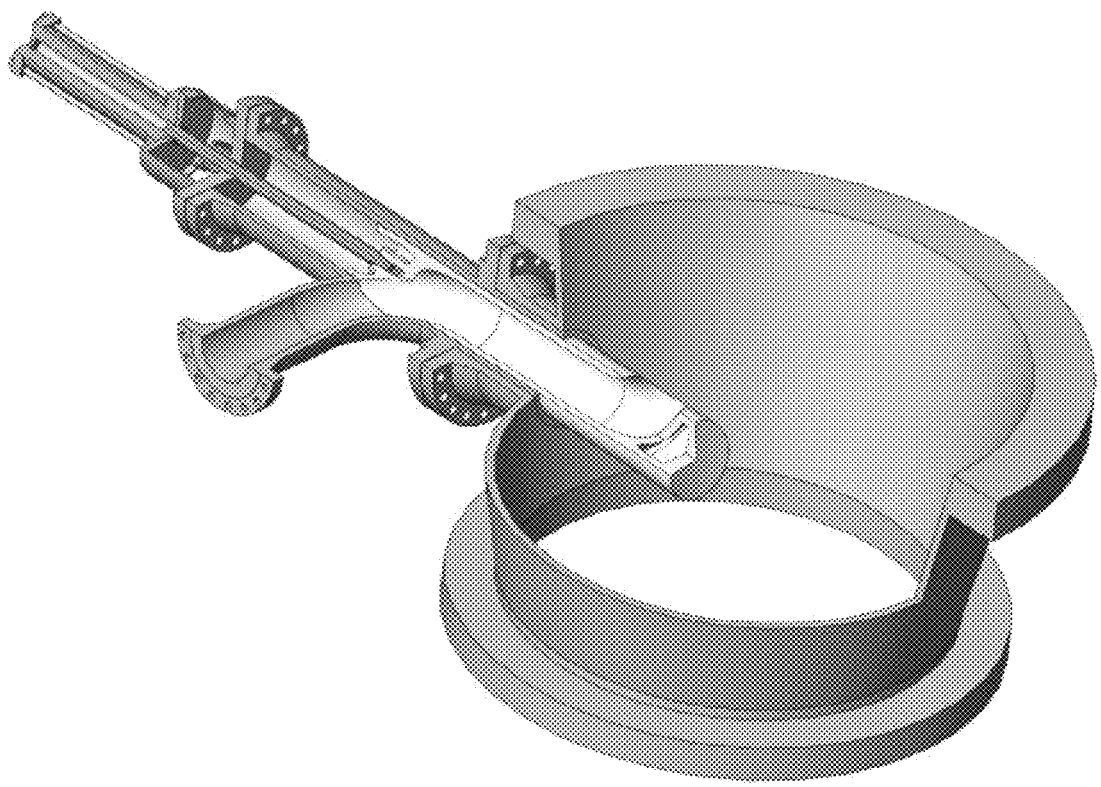
Figure 12D:
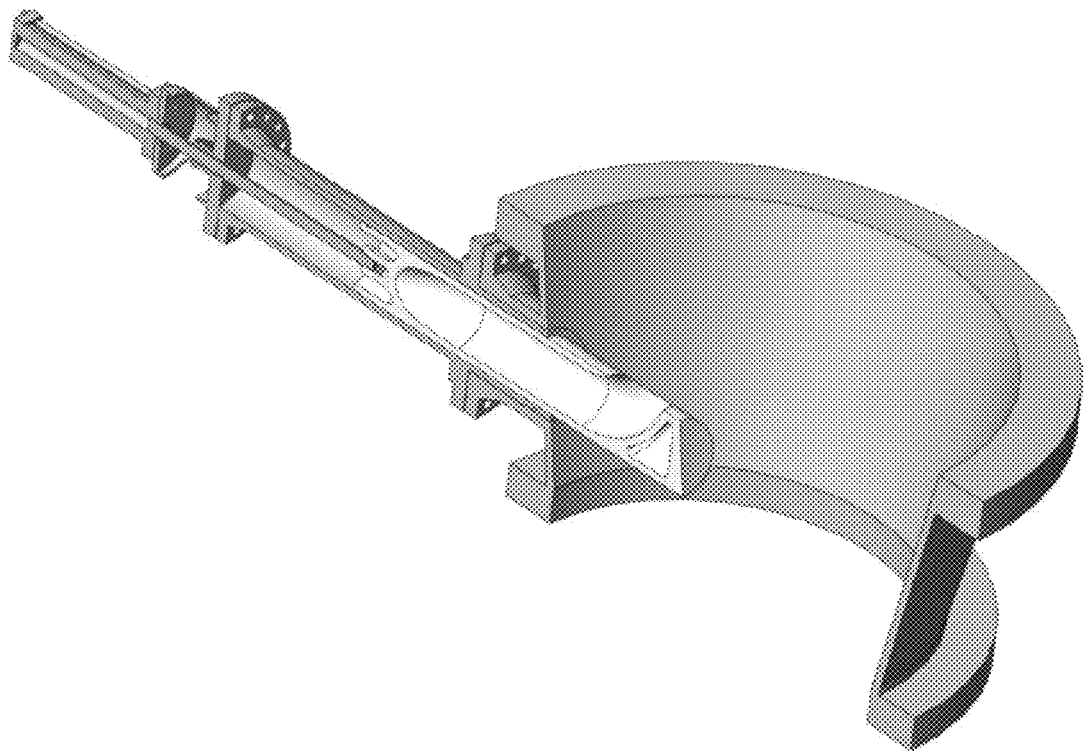
Figure 12E:
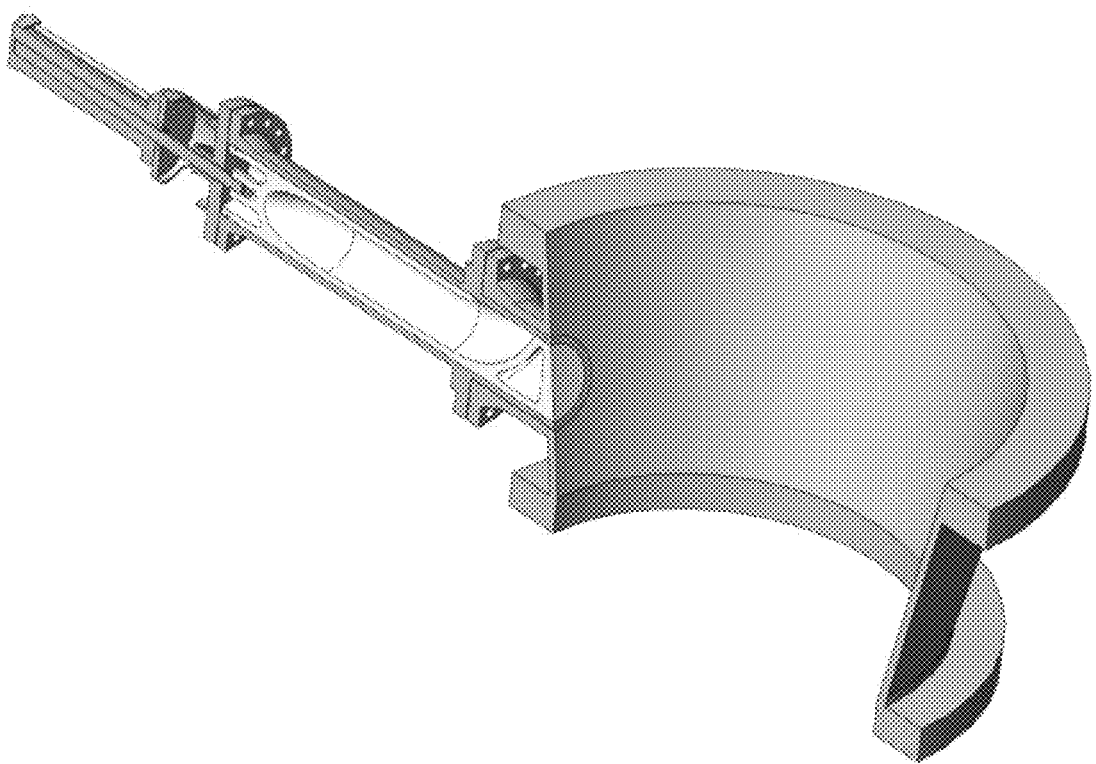

FIG. 12C illustrates a cut away view of the center feed system when the retractable injection nozzle is in the extended position. FIG. 12D illustrates a vertical cross sectional view of the center feed system when the retractable injection nozzle is in the extended position. FIG. 12E illustrates a vertical cross sectional view of the center feed system when the retractable injection nozzle is in the retracted position.

Figure 12F:
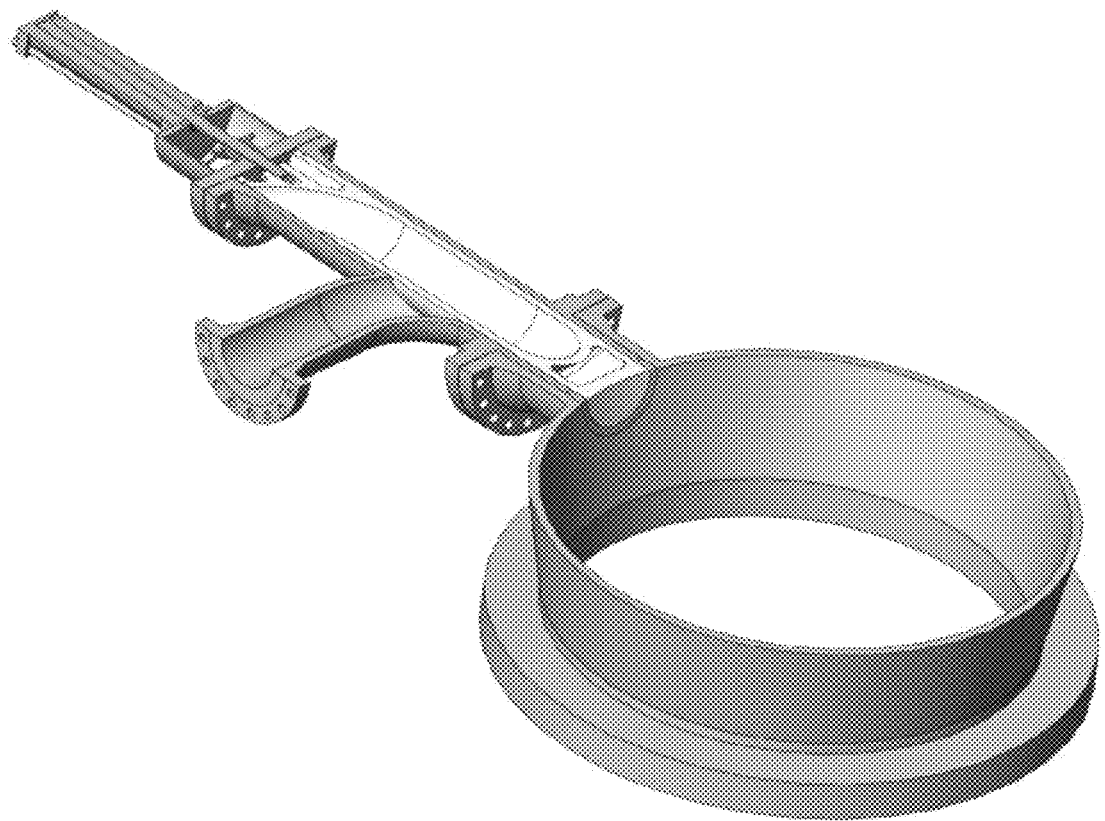
Figure 12G:
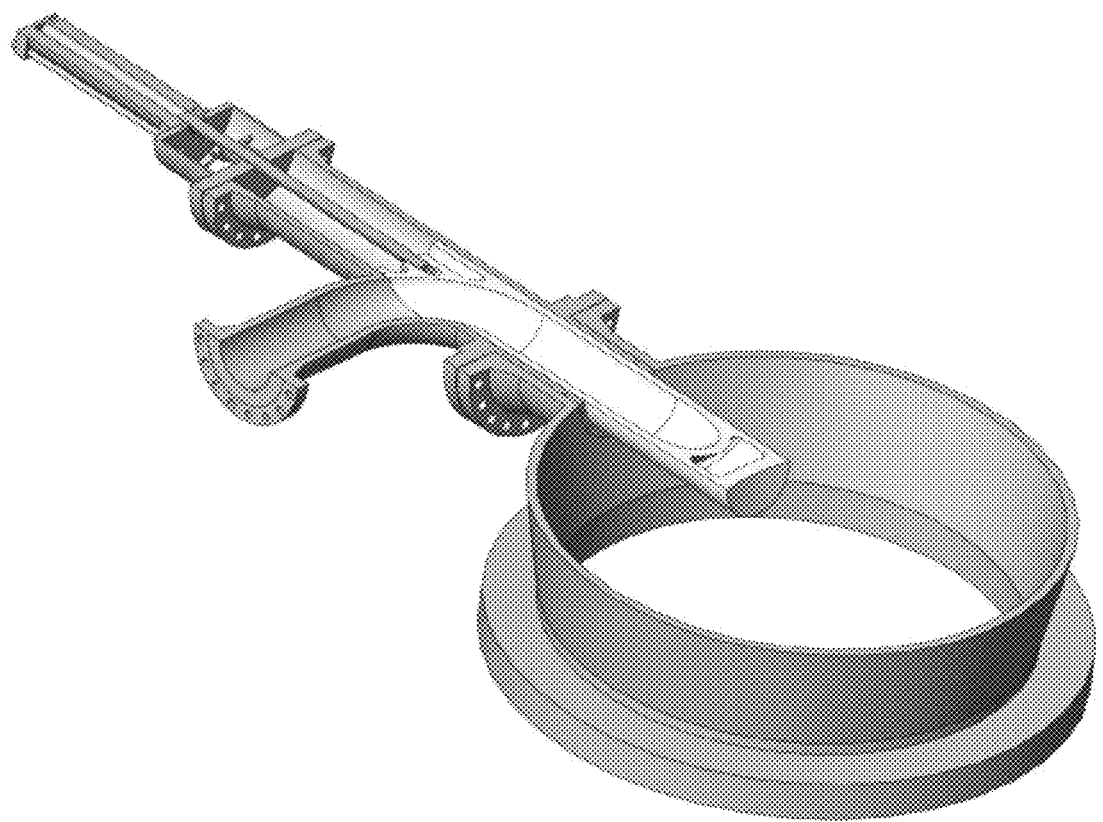

FIG. 12F illustrates a horizontal cross sectional view of the center feed system when the retractable injection nozzle is in the retracted position. Finally, FIG. 12G illustrates a horizontal cross sectional view of the center feed system when the retractable injection nozzle is in the extended position Although this specification primary describes center feed systems that have a single retractable injection nozzle, the present invention also extends to center feed systems where multiple retractable injection nozzles are used (e.g. two on opposite sides of the vessel or coke drum). In such cases, each of the multiple retractable injection nozzles could be configured in the same or different manner in accordance with any of the embodiments described herein.

Removable Inserts within Openings of the Retractable Injection Nozzle

As the byproduct is injected into the coke drum through the retractable injection nozzle, the one or more openings in the retractable injection nozzle can tend to wear out over time. If the openings become worn to the point that adequate control over the injection angle of the byproduct becomes unsatisfactory, it will be necessary to replace the retractable injection nozzle. However, because the retractable injection nozzle is typically a very large component consisting of a number of independent parts, it can be costly and difficult to replace.

In some embodiments of the invention, to address the cost and difficulty of replacing the retractable injection nozzle when the openings become worn, the one or more openings in the retractable injection nozzle can be configured to accept removable inserts such that the removable inserts can be independently replaced when they become worn. In this way, only the removable inserts need to be replaced thereby reducing the cost and difficulty of maintaining the retractable injection nozzle.

Figure 13:
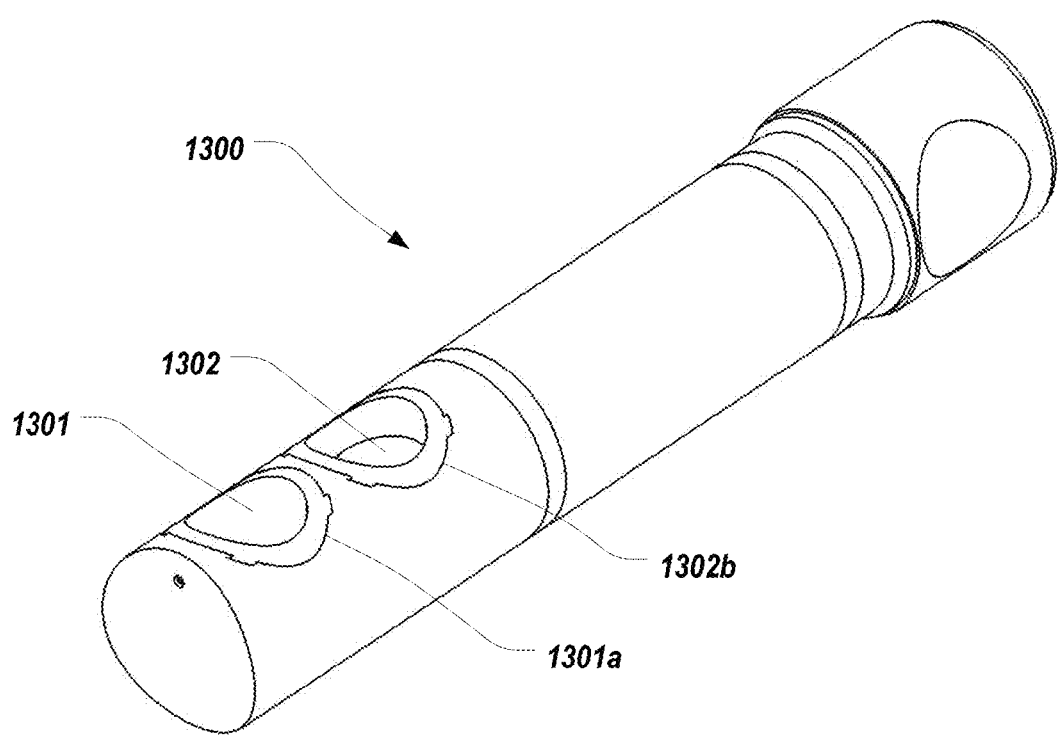
FIG. 13 illustrates a retractable injection nozzle that includes removable inserts in accordance with one or more embodiments of the invention.

FIG. 13 illustrates an example of a retractable injection nozzle 1300 that includes two openings 1301, 1302 that each includes a removable insert 1301a, 1302a respectively. Inserts 1301a and 1302a can be configured to have the same exterior contour as the exterior contour of retractable injection nozzle 1300 so that, once the inserts are inserted into openings 1301 and 1302, the exterior contour of the assembled retractable injection nozzle remains constant.

Figure 14A:
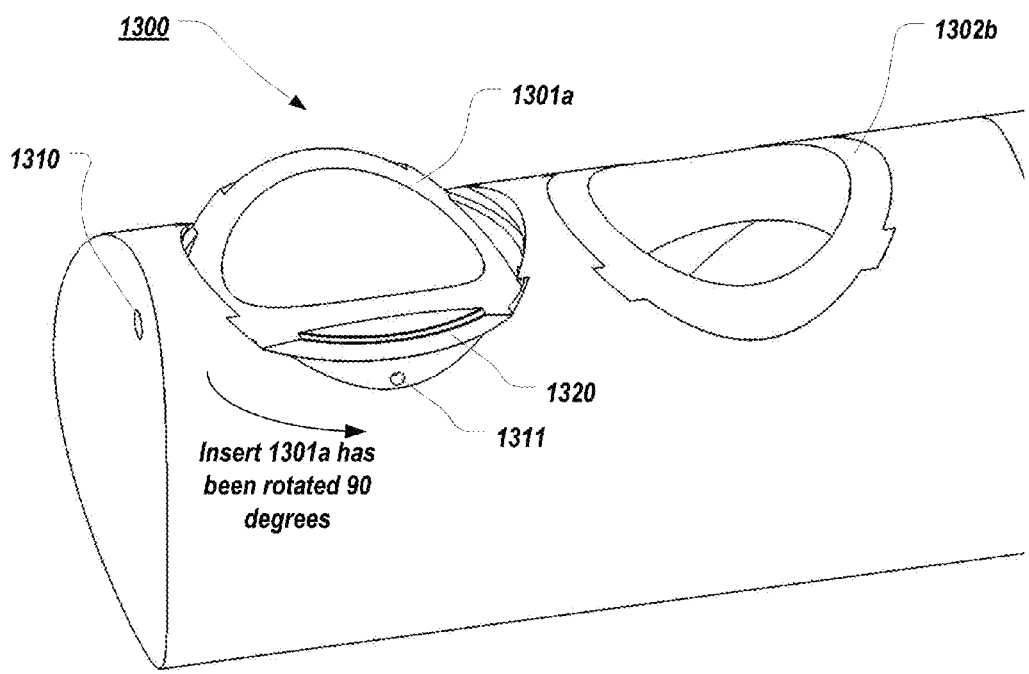
FIGS. 14A-14E illustrate various perspective views of a retractable injection nozzle having two openings with inserts where one of the inserts in partially unscrewed.

FIGS. 14A-14E illustrate an example manner in which inserts 1301*a* and 1302*a* can be configured to allow them to be removable from retractable injection nozzle 1300. FIG. 14A illustrates that inserts 1301*a* and 1302*a* can be threaded to allow the inserts to be screwed into openings 1301 and 1302. For example, insert 1301*a* is shown as having been rotated 90 degrees thereby raising the insert up slightly from opening 1301. Insert 1301*a* is shown as having threads 1320 that are configured to match corresponding threads formed within opening 1301. Insert 1302*a* can be configured in the same manner. Threads 1320 can be sufficiently thick to assist inserts 1301*a* and 1302*a* in resisting the forces applied by the byproduct as it flows therethrough thereby minimizing the possibility of inserts 1301*a* and 1302*a* becoming unthreaded during operation.

Also, FIG. 14*a* illustrates that insert 1301*a* includes a hole 1311 that aligns with hole 1310 in retractable injection nozzle 1300 when insert 1301*a* is fully threaded into opening 1301. Holes 1310 and 1311 can be threaded to allow a bolt to be secured within the holes thereby locking the position of insert 1301*a* within opening 1301.

Figure 14B:
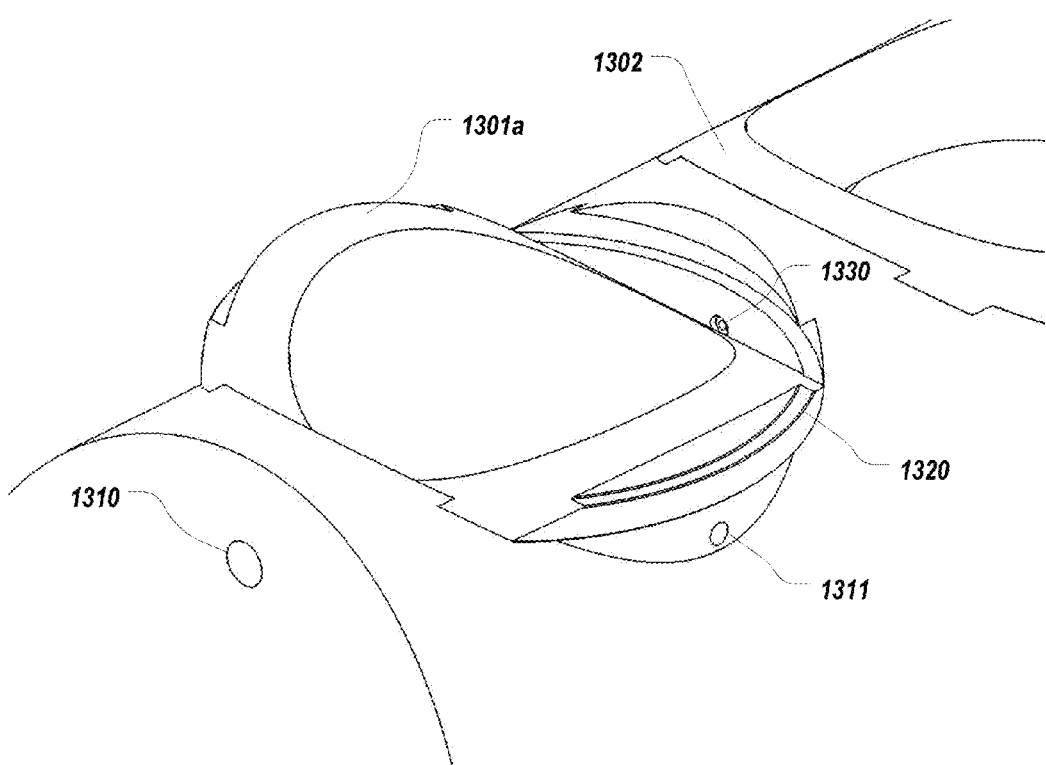

FIG. 14B provides a view of the retractable injection nozzle at a different angle than is shown in FIG. 14A. At this angle, another hole 1330 is visible. Hole 1330 can extend from opening 1301 into opening 1302 and can be positioned to align with a hole formed in insert 1302*a*. As with insert 1301*a*, a bolt can be threaded through hole 1330 and into the corresponding hole in insert 1302*a* to secure the position of insert 1302*a* within opening 1302. In this way, insert 1301*a* can first be removed (by removing the bolt from hole 1311 and unscrewing the insert) to expose the bolt that secures insert 1302*a*.

One benefit of positioning holes 1310 and 1330 as shown in FIGS. 14A and 14B is that the holes are not exposed to the flow path of the byproduct as it is injected through the retractable injection nozzle. In other words, hole 1330 is covered by insert 1301*a* while hole 1310 is on the portion of the retractable injection nozzle that can form a portion of sidewall 22 as shown in FIG. 3. In this way, neither hole is exposed to the byproduct while the byproduct is being injected at high pressure into the coke drum, and therefore the holes are protected from wear.

Figure 14C:
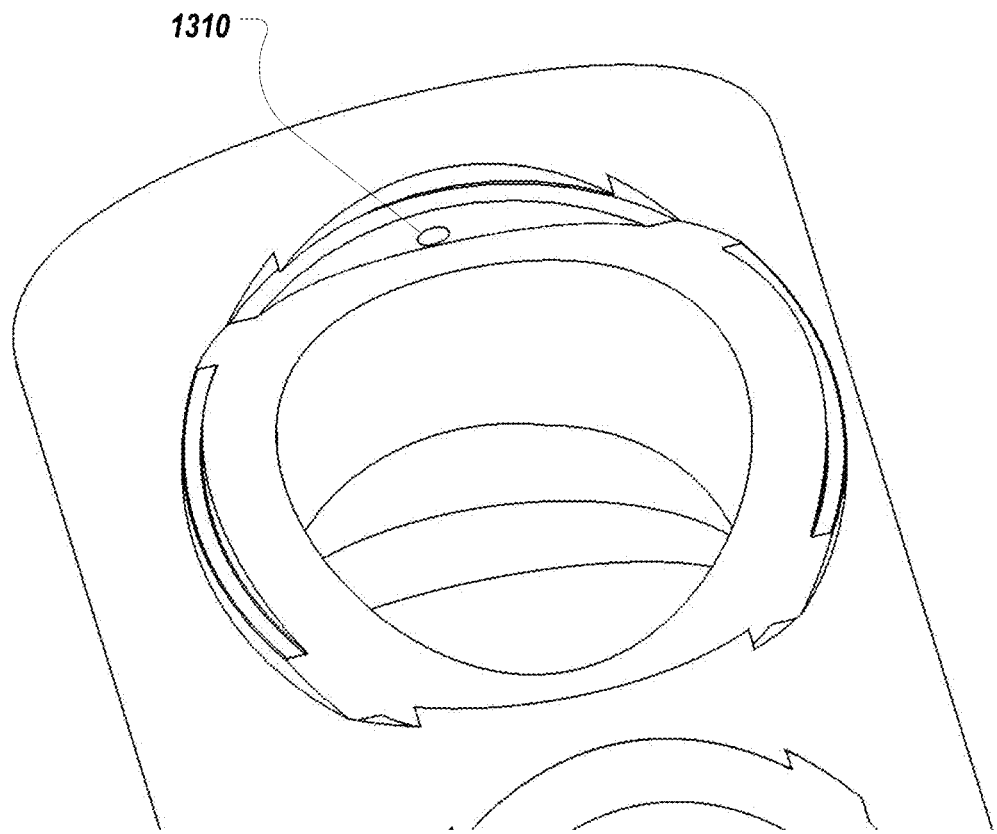
Figure 14D:
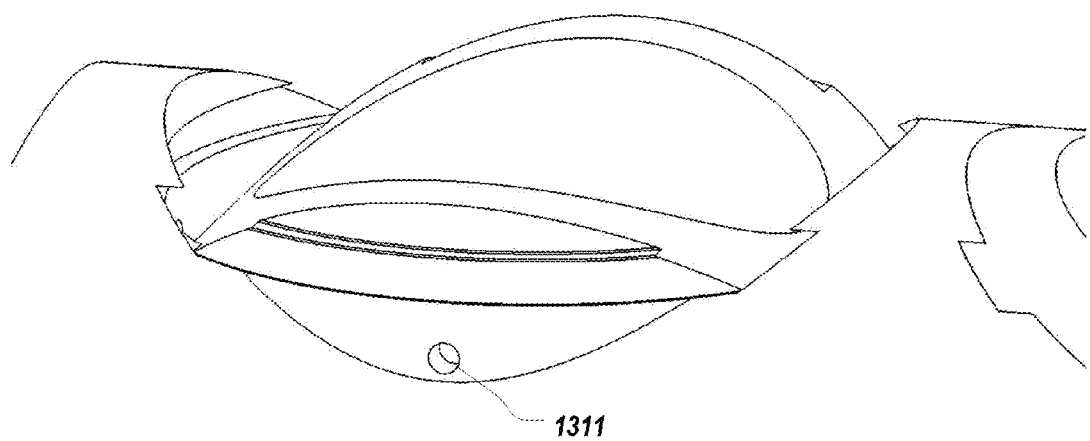
Figure 14E:
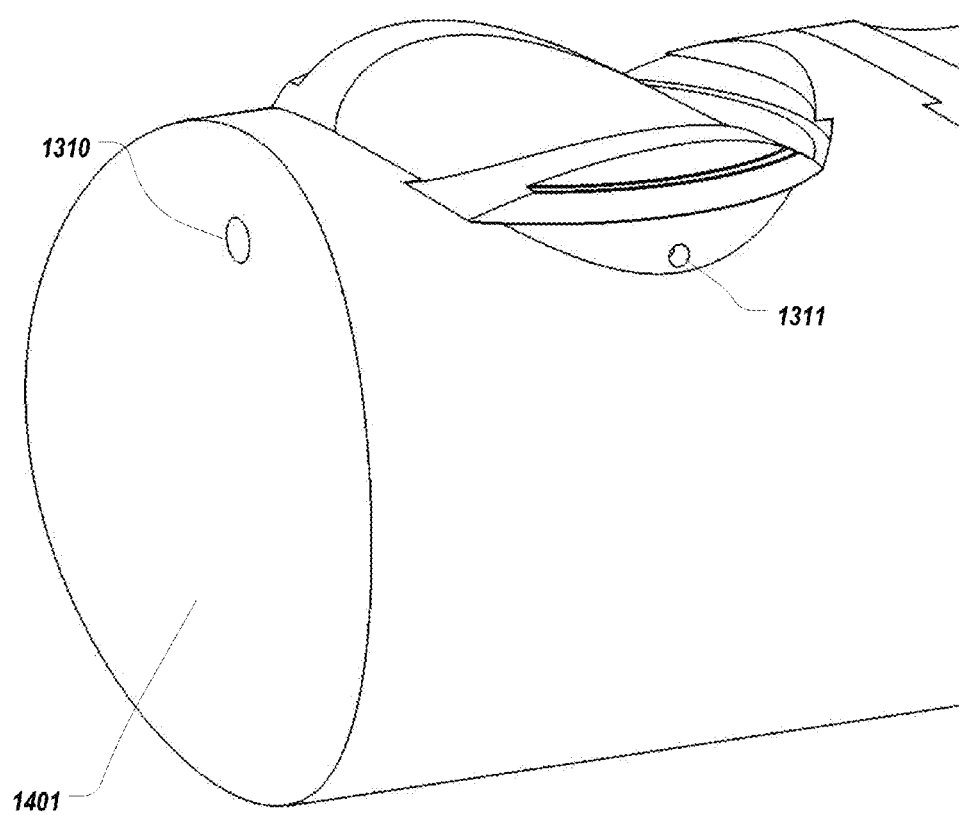

FIG. 14C illustrates another view of the retractable injection nozzle shown in FIGS. 14A and 14B. In this view, the end of hole 1310 that extends into opening 1301 is shown. FIGS. 14D and 14E likewise show other views of the retractable injection nozzle shown in FIGS. 14A-14C.

FIG. 14E also illustrates that the exterior contour of the end 1401 of retractable injection nozzle 1300 can be curved to match the contour of the sidewall of the coke drum or spool in which the retractable injection nozzle is used. This contour of end 1401 can assist in minimizing the damage that may result when the coke is removed from the coke drum. Specifically, because the contour of end 1401 matches the contour of the sidewall of the coke drum or spool, there is no edge that falling coke pieces can strike when retractable injection nozzle 1300 is in the retracted position.

Figure 15A:
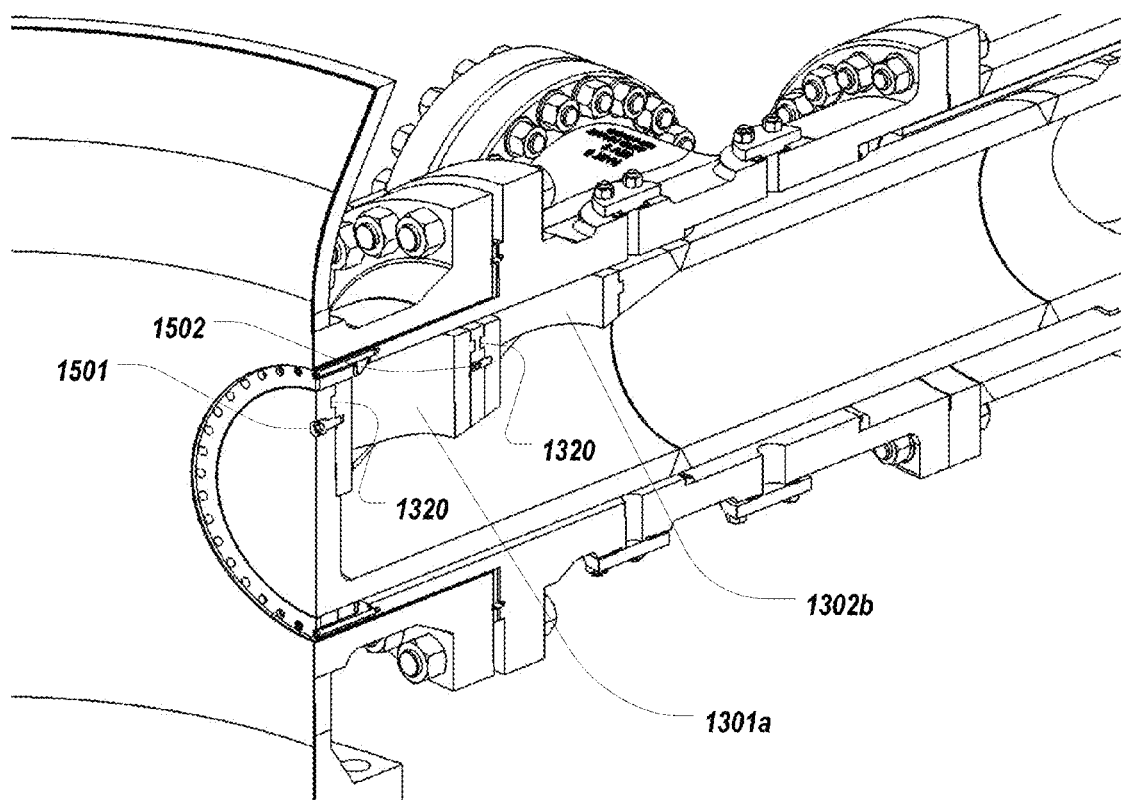
FIGS. 15A and 15B illustrate a cut-away perspective view of a retractable injection nozzle that includes removable inserts.
Figure 15B:
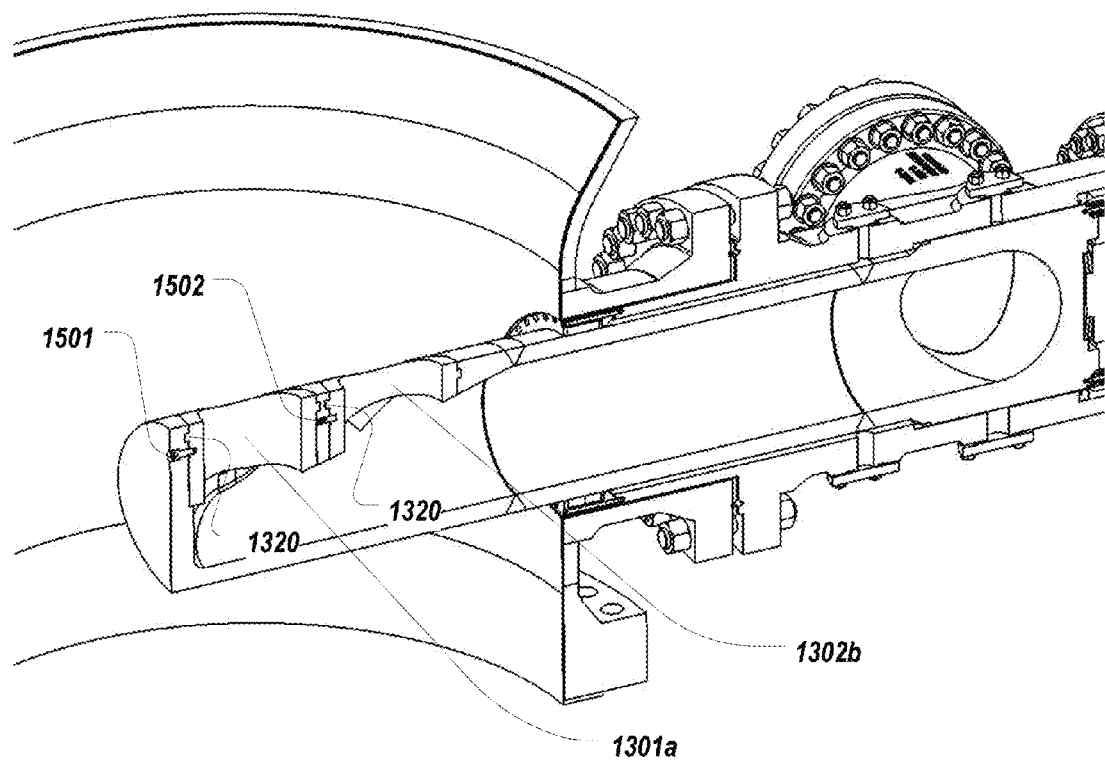

FIGS. 15A and 15B illustrate a cross-sectional view of retractable injection nozzle 1300 in a retracted and extended position respectively. In these views, bolts 1501 and 1502 are visible. Bolts 1501 and 1502 extend through holes 1310 and 1330 respectively to secure the inserts in place.

Another benefit of using inserts is that a particularly sized or shaped insert can be selected to manipulate the flow parameters of fluid passing there through. The appropriate size and shape of an insert can vary based on the temperature, pressure, viscosity, and kinetic model of the vapor phase of the byproduct. With two inserts as shown in FIG. 13, the inserts cooperate to produce a converging laminar flow of high velocity and with minimal pressure drop which is often within 10% of the pressure drop of bottom feed installations. The inserts must have sufficient orifice area to mitigate the pressure drop while keeping the distances between their centers and the end of the nozzle optimal.

Preventing Byproduct from Entering the Inlet Sleeve

Figure 16A:
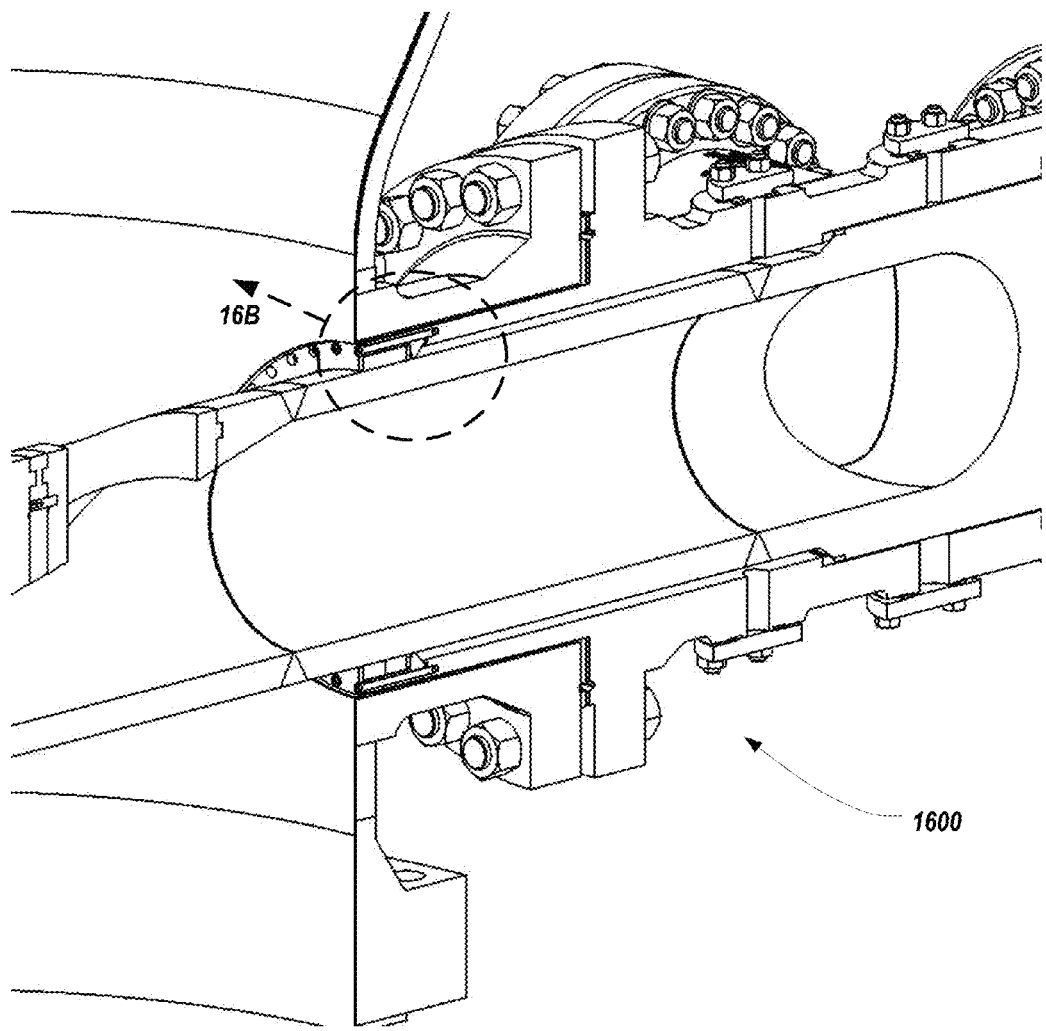
FIGS. 16A and 16B illustrate a cut-away perspective view of a retractable injection nozzle that includes a scraper.
Figure 16B:
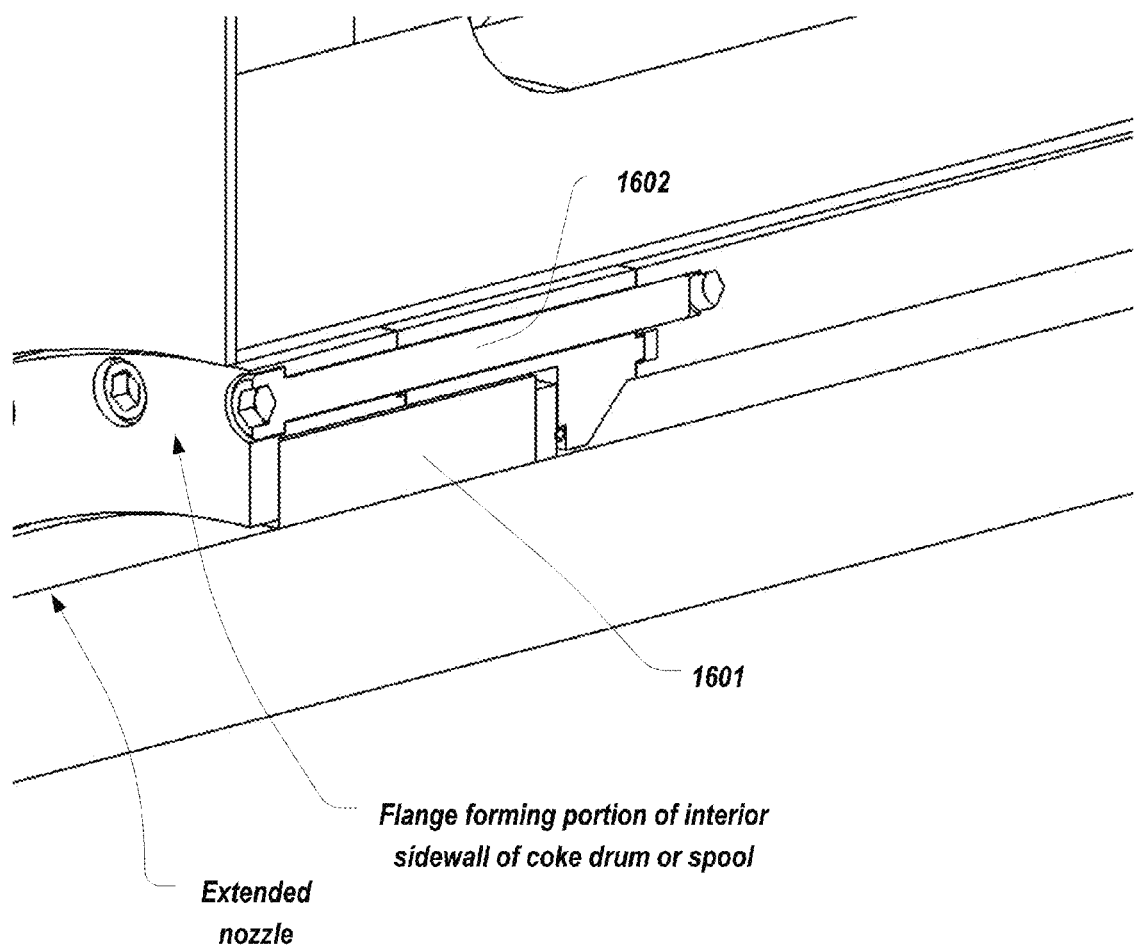

FIG. 16A illustrates a cross-sectional view of a retractable injection nozzle 1600 that includes a scraper 1601. FIG. 16B illustrates a close-up view of scraper 1601. As shown, scraper 1601 comprises a separate component of the inlet sleeve that is secured in place by a bolt 1602. Bolt 1602 secures the position of scraper 1601 so that scraper 1601 remains in tight contact with the exterior surface of the nozzle to thereby scrape off any coke that has accumulated on the exterior surface. It is noted that scraper 1601 is typically a ring that extends fully around the nozzle so that the entire exterior surface of the nozzle is scraped while being retracted. In some embodiments, scraper 1601 can also serve to form a pressure seal around retractable injection nozzle 1600. The pressure seal formed by scraper 1601 can enable pressurizing the compartment around retractable injection nozzle 1600 as is further described below with reference to FIG. 17.

In some embodiments, scraper 1601 can be configured to be radially compressible. In other words, the inside diameter of scraper 1601 when not installed around retractable injection nozzle 1600 can be smaller than the outside diameter of retractable injection nozzle 1600. In this way, scraper 1601 is installed around retractable injection nozzle 1600 by compressing the scraper (in a radially outward direction) so that scraper 1601 applies a radially inward force against the outer surface of retractable injection nozzle 1600. In some embodiments, scraper 1601 can be made compressible by forming a z-shaped channel through a portion of the scraper.

Figure 16C:
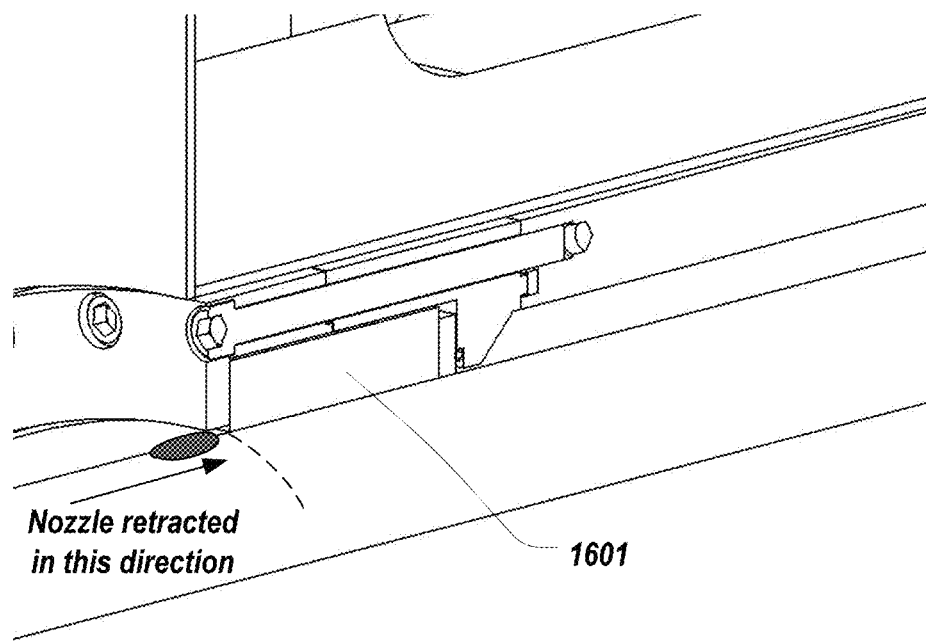
FIGS. 16C and 16D illustrate how the scraper of FIGS. 16A and 16B scrapes build-up material from the exterior surface of the retractable injection nozzle.
Figure 16D:
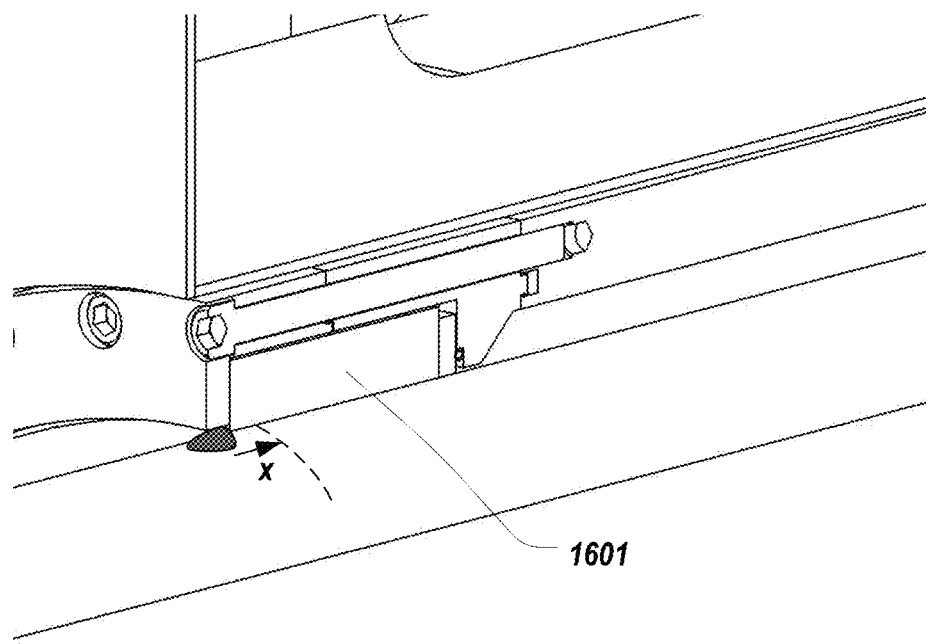

FIGS. 16C and 16D illustrate how scraper 1601 can scrape coke from the exterior surface of the retractable injection nozzle. In FIG. 16C, a piece of coke is shown as having built up on the injection nozzle. As the nozzle is retracted (to the right as indicated by the arrow in FIG. 16C), the piece of coke is scraped off of the nozzle by scraper 1601. For example, FIG. 16D illustrates that after the nozzle has been refracted a distance x, scraper 1601 has begun to scrape the piece of coke from the nozzle.

In some embodiments, scraper 1601 can be an independently removable component of the nozzle. For example, because scraper 1601 is subject to a significant amount of wear, it can be configured to be removed and replaced. Similarly, depending on the particular system in which the scraper is used, it may be desirable to use a scraper having different characteristics to enhance the efficiency of the system. For example, a scraper of a particular material, diameter, or thickness, or a scraper with a particular edge may be used depending on the characteristics of the byproduct or coke used in the system. By configuring scraper 1601 to be replaceable, this customization can be facilitated.

Although FIGS. 16A-16D illustrate scraper 1601 as having a front surface (i.e. the scraping surface) that is generally perpendicular to the surface of retractable injection nozzle 1600, in some embodiments, the front surface can be disposed at an angle thereby providing a "sharper" edge for scraping. For example, the leftmost edge of scraper 1601 shown in FIG. 16B can be angled back towards the right.

In some embodiments, a scraper configured similar to scraper 1601 can be positioned at other locations of a retractable injection nozzle. For example, a scraper can be positioned at the back most portion of the retractable injection nozzle (e.g. at the rightmost edge of nozzle 1300 shown in FIG. 13), or just forward of the inlet to the nozzle. Multiple scrapers may be desired in embodiments where residual byproduct is likely to pass between the inlet sleeve and the nozzle because the scrapers can scrape built-up coke from the surface of the nozzle. However, in embodiments where the inlet sleeve is pressurized (e.g. when scraper 1601 provides a pressure seal) only a single scraper may be necessary at the opening of the inlet sleeve to the coke drum.

Also, in embodiments where it is anticipated that residual byproduct will flow between the inlet sleeve and the nozzle, a solvent pot can be used to allow a solvent to be injected onto the outer surface of the retractable injection nozzle. In such cases, because coke can build up between the nozzle and the inlet sleeve and prevent the nozzle from retracting, the solvent can be used to remove the built-up coke to allow retracting of the nozzle.

Figure 17:
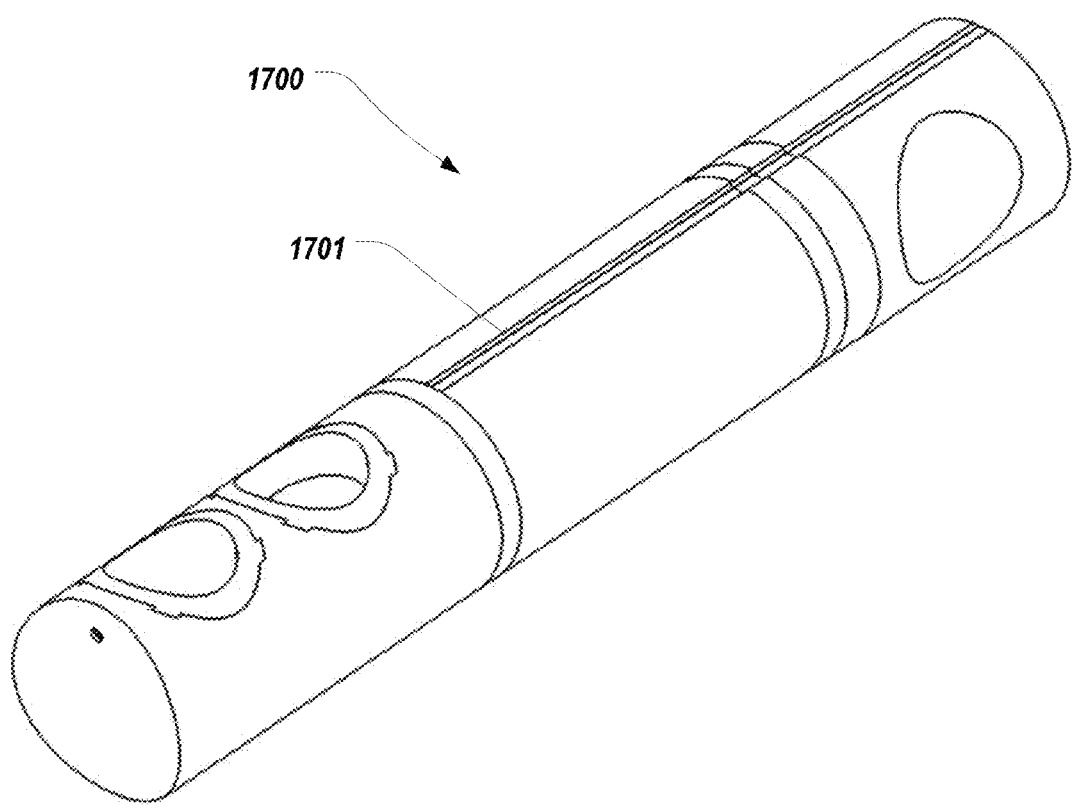
FIG. 17 illustrates a retractable injection nozzle that includes a groove that provides a channel for pressurizing the interior of the inlet sleeve.

FIG. 17 illustrates a retractable injection nozzle 1700 that includes a groove 1701 that runs lengthwise along the surface of the nozzle. Although nozzle 1700 is shown as including a single groove 1701, a nozzle can include two or more grooves as desired for a particular implementation. Also, in some embodiments, groove 1701 can be formed completely within the body of the nozzle (i.e. it can be a channel rather than a groove).

Groove 1701 can be used to provide pressure around retractable injection nozzle 1700. For example, while the nozzle is extended and residual byproduct is being flowed through the nozzle, steam pressure can be supplied through groove 1701 to pressurize the compartment between the nozzle and the inlet sleeve. This pressure can prevent residual byproduct from passing into the pressurized compartment. As stated above, scraper 1601 can form a seal for maintaining this pressure. Additional seals can be provided in some embodiments (e.g. at the back of the nozzle) by seats or other scrapers.

In some embodiments, groove 1701 can be used to pressurize the inlet sleeve when retractable injection nozzle 1700 is retracted into the inlet sleeve. For example, the nozzle can be retracted from the coke drum during the coking process or while coke is being removed from the coke drum. To prevent coke fines from entering in between the inlet sleeve and the nozzle, steam pressure can be supplied within groove 1700 so that an equal or greater pressure exists within the inlet sleeve than exists within the interior of the coke drum.

Because the coke drum is pressurized during the coking process, the pressure within the coke drum can be greater than the pressure that would otherwise exist within the inlet sleeve. Similarly, during removal of the coke when the de-header valve is open, a greater or equal pressure may still exist within the coke drum than within the inlet sleeve. Accordingly, by pressurizing the inlet sleeve using one or more of grooves 1701, this pressure differential can be minimized or eliminated thereby preventing coke fines or other particles from entering into the inlet sleeve.

By minimizing the amount of coke fines or other particles that enter in between the inlet sleeve and nozzle, the present invention can minimize the wear on the components of the center feed system thereby extending the life of the system. For example, if coke fines or other particles were to enter in between the nozzle and inlet sleeve, the fines would increase the friction on the two components as the nozzle slides back and forth between the extended and retracted positions. This additional friction can wear the components. Also, the additional friction can increase the force required to slide the nozzle which may reduce the life of the actuator that supplies the force. The coke fines or other particles could also pass into other areas of the center feed system causing undesirable consequences. However, by configuring nozzle 1700 with one or more grooves 1701, the inlet sleeve can be pressurized to minimize the possibility of fines or particles exiting the coke drum through the center feed system.

Minimizing the Available Area Required to use a Retractable Injection Nozzle

Because the retractable injection nozzle must be of a sufficient length to extend out into the center of the coke drum of spool, and because the retractable injection nozzle must be retracted completely from the coke drum of spool, a significant amount of available area may be required to use a retractable injection nozzle. Also, in many implementations, additional area is needed for the actuator that drives the movement of the retractable injection nozzle.

In many cases, however, minimal space is available for installing a retractable injection nozzle as part of a center feed system. For example, many coke drums are already in use that have minimal space available for adding a center feed system to supply residual byproduct to the coke drum. Similarly, even in new installations, the existence of other structures may limit the amount of space available for installing a center feed system that employs a retractable injection nozzle.

To address these issues, in some embodiments of the invention, the retractable injection nozzle can be modified to minimize the amount of space required to use the nozzle. These modifications include forming nozzle as a telescoping component and providing threads on the nozzle which allow it to be unscrewed within the coke drum or other vessel.

A telescoping injection nozzle can be used to minimize the distance to which the injection nozzle extends outwardly from the vessel when retracted. For example, unlike the retractable injection nozzle shown in the figures which comprises a generally singular length of material, a telescoping nozzle can be formed of a series of telescoping components. In this way, when retracted, the telescoping nozzle will contract within itself thereby minimizing the distance to which the retracted nozzle extends. This configuration can be particularly beneficial in installations where minimal space exists between the vessel and another structure.

To minimize the steps formed between adjacent components of the telescoping nozzle, the edges of the components can be angled as much as possible while retaining sufficient strength to secure the components together. In this way, the interior wall of the nozzle when extended can be more continuous than if the edges were flat.

The retractable injection nozzle, whether a telescoping nozzle or a nozzle as shown in the figures, can be configured to be unscrewed from within the coke drum or other vessel. For example, in cases where minimal space exists between the coke drum and another structure, there may not be sufficient space between the inlet sleeve and the other structure to insert or remove the retractable injection nozzle.

By configuring the retractable injection nozzle to be threaded into the inlet sleeve from the inside (i.e. while the nozzle is within the coke drum or other vessel), the amount of space required between the inlet sleeve and another structure is reduced. The retractable injection nozzle can be threaded in any appropriate manner. In one example, the portion of the injection nozzle that attaches to the actuator (see, e.g. FIGS. 12A-12G) can be threaded so that the nozzle is screwed onto the actuator. In this manner, the retractable injection nozzle remains free to move within the inlet sleeve without requiring significant changes to the inlet sleeve depicted in the figures. In other cases, the inlet sleeve can be modified to include one or more components to which the nozzle can be attached which remain free to move within the inlet sleeve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A center feed system comprising:
an inlet sleeve configured to attach to a vessel; and
a retractable injection nozzle contained within the inlet sleeve, the retractable injection nozzle sliding within the inlet sleeve to extend into and retract from the vessel for introducing residual byproduct into the vessel, the retractable injection nozzle including one or more openings that are exposed within the vessel when the retractable injection nozzle is extended, the residual byproduct exiting the retractable injection nozzle through the one or more openings;
wherein the one or more openings each include an insert that can be removed from the opening.

2. The center feed system of claim 1, wherein the one or more inserts are threaded into the openings.

3. The center feed system of claim 1, wherein the one or more inserts are bolted to the retractable injection nozzle.

4. The center feed system of claim 3, wherein at least one of the one or more inserts is bolted to the retractable injection nozzle via a hole that extends from the opening in which the at least one insert is placed and into another opening.

5. The center feed system of claim 3, wherein one of the openings is bolted to the retractable injection nozzle via a hole that extends from the opening in which the opening is placed and into the interior of the vessel.

6. The center feed system of claim 1, wherein the retractable injection nozzle includes two openings that each has a removable insert.

7. The center feed system of claim 6, wherein one insert extends further into the retractable injection nozzle than the other insert.

8. The center feed system of claim 7, wherein the distance to which each insert extends into the retractable injection nozzle is selected to minimize the pressure drop.

9. The center feed system of claim 1, wherein the end of the retractable injection nozzle that extends into the vessel is contoured to match the contour of the interior sidewall of the vessel.

10. The center feed system of claim 1, wherein the inlet sleeve includes a scraper that is positioned against the exterior surface of the retractable injection nozzle such that, as the retractable injection nozzle is retracted into the inlet sleeve, any residual byproduct that has built up on the exterior surface is scraped from the exterior surface.

11. The center feed system of claim 10, wherein the scraper comprises a ring that encircles the retractable injection nozzle.

12. The center feed system of claim 1, wherein the retractable injection nozzle includes one or more grooves that extend lengthwise along the exterior surface of the retractable injection nozzle, the one or more grooves providing a channel through which the interior of the inlet sleeve can be pressurized.

13. The center feed system of claim 12, wherein the interior of the inlet sleeve is pressurized using steam supplied through the one or more grooves.

14. The center feed system of claim 1, wherein the retractable injection nozzle is comprised of a plurality of telescoping components.

15. The center feed system of claim 1, wherein the retractable injection nozzle is configured with threads that allow the retractable injection nozzle to be screwed into and out from the inlet sleeve while the retractable injection nozzle is extended into the vessel.

16. The center feed system of claim 15, wherein the retractable injection nozzle is screwed to an actuator attached to the inlet sleeve.

17. A center feed system comprising:
an inlet sleeve configured to attach to a vessel; and
a retractable injection nozzle contained within the inlet sleeve, the retractable injection nozzle sliding within the inlet sleeve to extend into and retract from the vessel for introducing residual byproduct into the vessel, the retractable injection nozzle including one or more openings that are exposed within the vessel when the retractable injection nozzle is extended, the residual byproduct exiting the retractable injection nozzle through the one or more openings;
wherein the one or more openings each include an insert that can be removed from the opening; and
wherein the inlet sleeve includes a scraper that extends around at least a portion of the exterior surface of the retractable injection nozzle and that scrapes residual byproduct from the exterior surface as the retractable injection nozzle is retracted into the inlet sleeve.

18. The center feed system of claim 17, wherein the scraper comprises a ring that extends around the retractable injection nozzle.

19. A center feed system comprising:
an inlet sleeve configured to attach to a vessel; and
a retractable injection nozzle contained within the inlet sleeve, the retractable injection nozzle sliding within the inlet sleeve to extend into and retract from the vessel for introducing residual byproduct into the vessel, the retractable injection nozzle including one or more openings that are exposed within the vessel when the retractable injection nozzle is extended, the residual byproduct exiting the retractable injection nozzle through the one or more openings;
wherein the retractable injection nozzle includes one or more grooves that extend lengthwise along the exterior surface of the retractable injection nozzle, the one or more grooves providing a channel through which steam is supplied to the interior of the inlet sleeve to pressurize the interior of the inlet sleeve.

20. The center feed system of claim 19, wherein the one or more openings each include an insert that can be removed from the opening.

* * * * *